(12) United States Patent
Yoshikawa et al.

(10) Patent No.: US 10,746,288 B2
(45) Date of Patent: Aug. 18, 2020

(54) VEHICLE CONTROL APPARATUS

(71) Applicants: TOYOTA JIDOSHA KABUSHIKI KAISHA, Toyota-shi, Aichi (JP); AISIN AW CO., LTD., Anjo-shi, Aichi (JP)

(72) Inventors: Masato Yoshikawa, Toyota (JP); Nobufusa Kobayashi, Anjo (JP); Daisuke Suyama, Anjo (JP); Kazuomi Okasaka, Anjo (JP); Atsushi Kayukawa, Anjo (JP); Mitsuru Maeda, Anjo (JP)

(73) Assignees: TOYOTA JIDOSHA KABUSHIKI KAISHA, Toyota (JP); AISIN AW CO., LTD., Anjo-shi (JP)

( * ) Notice: Subject to any disclaimer, the term of this patent is extended or adjusted under 35 U.S.C. 154(b) by 100 days.

(21) Appl. No.: 16/050,467

(22) Filed: Jul. 31, 2018

(65) Prior Publication Data

US 2019/0032774 A1 Jan. 31, 2019

(30) Foreign Application Priority Data

Jul. 31, 2017 (JP) ................................ 2017-148665

(51) Int. Cl.
*F16H 61/02* (2006.01)
*F16H 61/04* (2006.01)
(Continued)

(52) U.S. Cl.
CPC ......... *F16H 61/0213* (2013.01); *B60K 6/445* (2013.01); *B60W 10/115* (2013.01); *B60W 20/00* (2013.01); *F16H 61/0437* (2013.01); *B60K 6/365* (2013.01); *B60K 6/547* (2013.01); *B60W 2510/0661* (2013.01); *B60W 2510/1095* (2013.01); *B60W 2710/1005* (2013.01); (Continued)

(58) Field of Classification Search
None
See application file for complete search history.

(56) References Cited

U.S. PATENT DOCUMENTS

2017/0299053 A1   10/2017   Kobayashi et al.

FOREIGN PATENT DOCUMENTS

| JP | S6288859 A | * | 4/1987 | ............ B60W 10/04 |
| JP | H04366068 A | * | 6/1991 | |

(Continued)

*Primary Examiner* — Abdhesh K Jha
(74) *Attorney, Agent, or Firm* — Oliff PLC

(57) ABSTRACT

A control apparatus for a vehicle provided with a step-variable transmission which is disposed between drive wheels and a drive power source including at least an engine, and which is shifted by changing operating states of coupling devices, the control apparatus including an engine stability time estimating portion configured to estimate a length of stability time required for stabilization of an output state of the engine, when a determination to implement a power-on shift-down action of the step-variable transmission is made, and a control portion configured to delay a moment of generation of a shift-down command to implement the power-on shift-down action of the step-variable transmission, with respect to a moment of the determination to implement the power-on shift-down action, where the estimated length of stability time is longer than a predetermined value.

7 Claims, 9 Drawing Sheets

(51) Int. Cl.
*F16H 37/08* (2006.01)
*B60K 6/445* (2007.10)
*B60K 6/547* (2007.10)
*B60K 6/365* (2007.10)
*B60W 10/115* (2012.01)
*B60W 20/00* (2016.01)
*F16H 59/14* (2006.01)
*F16H 3/72* (2006.01)
*F16H 61/686* (2006.01)

(52) U.S. Cl.
CPC ........... *B60Y 2200/92* (2013.01); *F16H 3/727* (2013.01); *F16H 37/0826* (2013.01); *F16H 59/141* (2013.01); *F16H 61/686* (2013.01); *F16H 2059/147* (2013.01); *F16H 2200/0043* (2013.01); *F16H 2200/2007* (2013.01); *F16H 2200/2041* (2013.01); *F16H 2200/2066* (2013.01); *F16H 2200/2082* (2013.01)

(56) References Cited

FOREIGN PATENT DOCUMENTS

| JP | 2006-009942 A | | 1/2006 | |
|---|---|---|---|---|
| JP | 2009298175 A | * | 12/2009 | .......... B60W 10/115 |
| JP | 2010255586 A | * | 11/2010 | |
| JP | 2017-194102 A | | 10/2017 | |

* cited by examiner

| AT GEAR POSITION | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |

| OVERALL SPEED POSITION | 1 | 2 | 3 | 4 | 5 | 6 | 7 | 8 | 9 | 10 |
|---|---|---|---|---|---|---|---|---|---|---|
| AT GEAR POSITION | 1 | 1 | 1 | 2 | 2 | 2 | 3 | 3 | 3 | 4 |

US 10,746,288 B2

VEHICLE CONTROL APPARATUS

This application claims priority from Japanese Patent Application No. 2017-148665 filed on Jul. 31, 2017, the disclosure of which is herein incorporated by reference in its entirety.

FIELD OF THE INVENTION

The present invention relates to a control apparatus for a vehicle provided with a mechanically operated step-variable transmission disposed between a drive power source and drive wheels, which control apparatus is configured to reduce an engaging shock of a coupling device of the step-variable transmission in the process of a power-on shift-down action of the step-variable transmission.

BACKGROUND OF THE INVENTION

There is well known a vehicle provided with a mechanically operated step-variable transmission disposed between a drive power source and drive wheels. JP-2006-9942A discloses an example of this type of vehicle. This vehicle is a hybrid vehicle the drive power source of which includes an engine, and first and second electric motors which are operatively connected in a power transmittable manner to planetary gear sets functioning as a differential mechanism, and various rotary elements of the planetary gear sets. JP-2006-9942A also discloses a technique for calculating output torques of the first and second electric motors on the basis of their electric current values, estimating an input torque of the step-variable transmission on the basis of the calculated output torques of the first and second electric motors, and controlling transient hydraulic pressures to be applied to coupling devices of the step-variable transmission to implement its shifting actions, on the basis of the estimated input torque.

By the way, the transient hydraulic pressures to be applied to the coupling devices in the process of the shifting actions of the step-variable transmission are controlled on the basis of the input torque of the step-variable transmission, in a vehicle the drive power source of which consists solely of an engine, as well as in the hybrid vehicle the drive power source of which includes the electric motors as disclosed in JP-2006-9942A. A power-on shift-down action of the step-variable transmission is required to have a high degree of control response, so that the power-on shift-down action is desirably implemented immediately after a moment of determination to implement the power-on shift-down action. If a shift-down command to implement the power-on shift-down action is generated immediately after the moment of determination to implement the power-on shift-down action, however, the engine torque (engine power as well) has not been fully raised at a point of time of initiation of an inertia phase of the power-on shift-down action of the step-variable transmission, so that the engine torque and the engine power may increase at a high rate after the initiation of the inertia phase. Accordingly, there is a risk of generation of a considerable engaging shock of a coupling device of the step-variable transmission in the process of an engaging action of the coupling device, due to a high rate of rise of a rotating speed of an input shaft of the step-variable transmission, namely, a racing of the input shaft, which is caused by surplus torque and power of the engine. In the hybrid vehicle in which an electric motor is operatively connected in a power transmittable manner to the input shaft of the step-variable transmission, for example, the engaging shock of the coupling device can be reduced by the electric motor which absorbs the surplus torque and power of the engine. However, a regenerative operation of the electric motor increases a load on a battery, and it is difficult for the electric motor to absorb the surplus torque and power of the engine, when the regenerative operation of the electric motor is limited, so that the engaging shock of the coupling device is undesirably increased in the process of the shift-down action of the step-variable transmission.

SUMMARY OF THE INVENTION

The present invention was made in view of the background art described above. It is therefore an object of the present invention to provide a control apparatus for a vehicle provided with a mechanically operated step-variable transmission disposed between a drive power source and drive wheels, which control apparatus permits reduction of an engaging shock of a coupling device of the step-variable transmission in the process of a power-on shift-down action of the step-variable transmission.

The object indicated above is achieved according to the following modes of the present invention:

According to a first mode of the invention, there is provided a control apparatus for a vehicle provided with a step-variable transmission which is disposed between drive wheels and a drive power source including at least an engine, and which is shifted by changing operating states of coupling devices, the control apparatus comprising: an engine stability time estimating portion configured to estimate a length of stability time required for stabilization of an output state of the engine, when a determination to implement a power-on shift-down action of the step-variable transmission is made; and a control portion configured to delay a moment of generation of a shift-down command to implement the power-on shift-down action of the step-variable transmission, with respect to a moment of the determination to implement the power-on shift-down action, where the estimated length of stability time is longer than a predetermined value.

According to a second mode of the invention, the control apparatus according to the first mode of the invention is configured such that the control portion calculates a length of delay of the moment of generation of the shift-down command from the moment of determination to implement the power-on shift-down action, such that the length of delay increases with an increase of the estimated length of stability time.

According to a third mode of the invention, the control apparatus according to the first or second mode of the invention is configured such that the length of stability time is a length of time until a rate of rise of an output torque or power of the engine is lowered to or below a predetermined value, in the process of the power-on shift-down action of the step-variable transmission.

According to a fourth mode of the invention, the control apparatus according to the second mode of the invention is configured such that the length of delay of the moment of generation of the shift-down command has a predetermined upper limit, and the predetermined upper limit is set as the length of delay where the calculated length of delay is longer than the upper limit.

According to a fifth mode of the invention, the control apparatus according to any one of the first through fourth modes of the invention is configured such that the predetermined value of the length of stability time is set to be a length of time from the moment of generation of the shift-down command to a moment of initiation of an inertia phase of the power-on shift-down action of the step-variable transmission.

According to a sixth mode of the invention, the control apparatus according to the second mode of the invention is configured such that the length of delay of the moment of generation of the shift-down command is set to be equal to or longer than a difference between the estimated length of stability time and the predetermined value.

According to a seventh mode of the invention, the control apparatus according to any one of the first through sixth modes of the invention is configured such that the drive power source includes the engine, a differential mechanism and a second motor/generator, and the differential mechanism includes a first rotary element operatively connected to the engine in a power transmittable manner, a second rotary element operatively connected to a first motor/generator in a power transmittable manner, and a third rotary element connected to an input shaft of the step-variable transmission, the second motor/generator being operatively connected to the third rotary element in a power transmittable manner.

The control apparatus according to the first mode of the invention is configured to delay the moment of generation of the shift-down command to implement the power-on shift-down action of the step-variable transmission, where the estimated length of stability time required for stabilization of the output state of the engine is longer than the predetermined value. Namely, where the length of time required for stabilization of the output state of the engine is relatively long, the moment of initiation of the power-on shift-down action of the step-variable transmission is delayed, so that the power-on shift-down action can be implemented while the output state of the engine is held in a more stable state, than where the moment of generation of the power-on shift-down command is not delayed. Accordingly, the risk of generation of an engaging shock of an engaging-side coupling device to be brought into its engaged state to implement the power-on shift-down action can be more effectively reduced. Where the length of stability time is not longer than the predetermined value, the output state of the engine can be stabilized in a shorter length of time. In this case, the moment of initiation of the power-on shift-down action is not delayed, so that the power-on shift-down action can be implemented with a higher degree of control response.

According to the second mode of the invention, the length of delay of the moment of generation of the shift-down command from the moment of determination to implement the power-on shift-down action is calculated such that the length of delay increases with an increase of the estimated length of stability time. Accordingly, the moment of generation of the shift-down command is delayed by a length of time which is increased with the increase of the estimated length of stability time required for stabilization of the output state of the engine, so that the shift-down action can be implemented while the output state of the engine is stabilized, with the length of delay being set at an adequate value corresponding to the estimated length of stability time, and the risk of generation of the engaging shock of the engaging-side coupling device to be brought into its engaged state to implement the shift-down action can be reduced.

According to the third mode of the invention, the length of stability time is the length of time until a rate of rise of the output torque or power of the engine is lowered to or below the predetermined value, in the process of the power-on shift-down action of the step-variable transmission. Accordingly, the rate of rise of the output torque or power of the engine in the process of the power-on shift-down action is reduced, and the risk of generation of the engaging shock of the engaging-side coupling device due to the rise of the output torque or power of the engine can be reduced.

According to the fourth mode of the invention, the length of delay of the moment of generation of the shift-down command has the predetermined upper limit, and this upper limit is set as the length of delay where the calculated length of delay is longer than the upper limit. Accordingly, it is possible to reduce the deterioration of the control response of the shift-down action due to an excessively long length of delay of the moment of generation of the shift-down command.

According to the fifth mode of the invention, the predetermined value of the length of stability time is set to be a length of time from the moment of generation of the shift-down command to a moment of initiation of an inertia phase of the power-on shift-down action of the step-variable transmission. Therefore, the moment of generation of the shift-down command is delayed where the output state of the engine has not been stabilized before the moment of initiation of the inertia phase, so that it is possible to reduce the risk of generation of the engaging shock of the engaging-side coupling device due to an increase of the torque or power of the engine during the inertia phase.

The control apparatus according to the sixth mode of the invention is configured such that the length of delay of the moment of generation of the shift-down command is set to be equal to or longer than a difference between the estimated length of stability time and the predetermined value, so that the length of delay which increases with an increase of the estimated length of stability time required for stabilization of the output state of the engine is set at an adequate value corresponding to the estimated length of stability time, whereby the power-on shift-down action can be implemented while the output state of the engine is held in a stabilized state.

According to the seventh mode of the invention, a rate of rise of an input shaft speed of the step-variable transmission in the process of the power-on shift-down action can be restricted by a regenerative control of the second motor/generator, and the risk of generation of the engaging shock of the engaging-side coupling device can be reduced. In this respect, it is noted that where a maximum charging amount of a battery is relatively small, the amount of an electric power regenerated by the second motor/generator is limited, so that it is difficult to reduce the risk of generation of the engaging shock of the engaging-side coupling device. Where the estimated length of stability time is longer than the predetermined value, the risk of generation of the engaging shock of the engaging-side coupling device due to an increase of the engine torque or power in the process of the power-on shift-down action can be reduced by delaying the moment of generation of the shift-down command to implement the shift-down action of the step-variable transmission, even when the amount of regeneration of the electric power by the second motor/generator is limited.

DETAILED DESCRIPTION OF INVENTION

Figure 1:
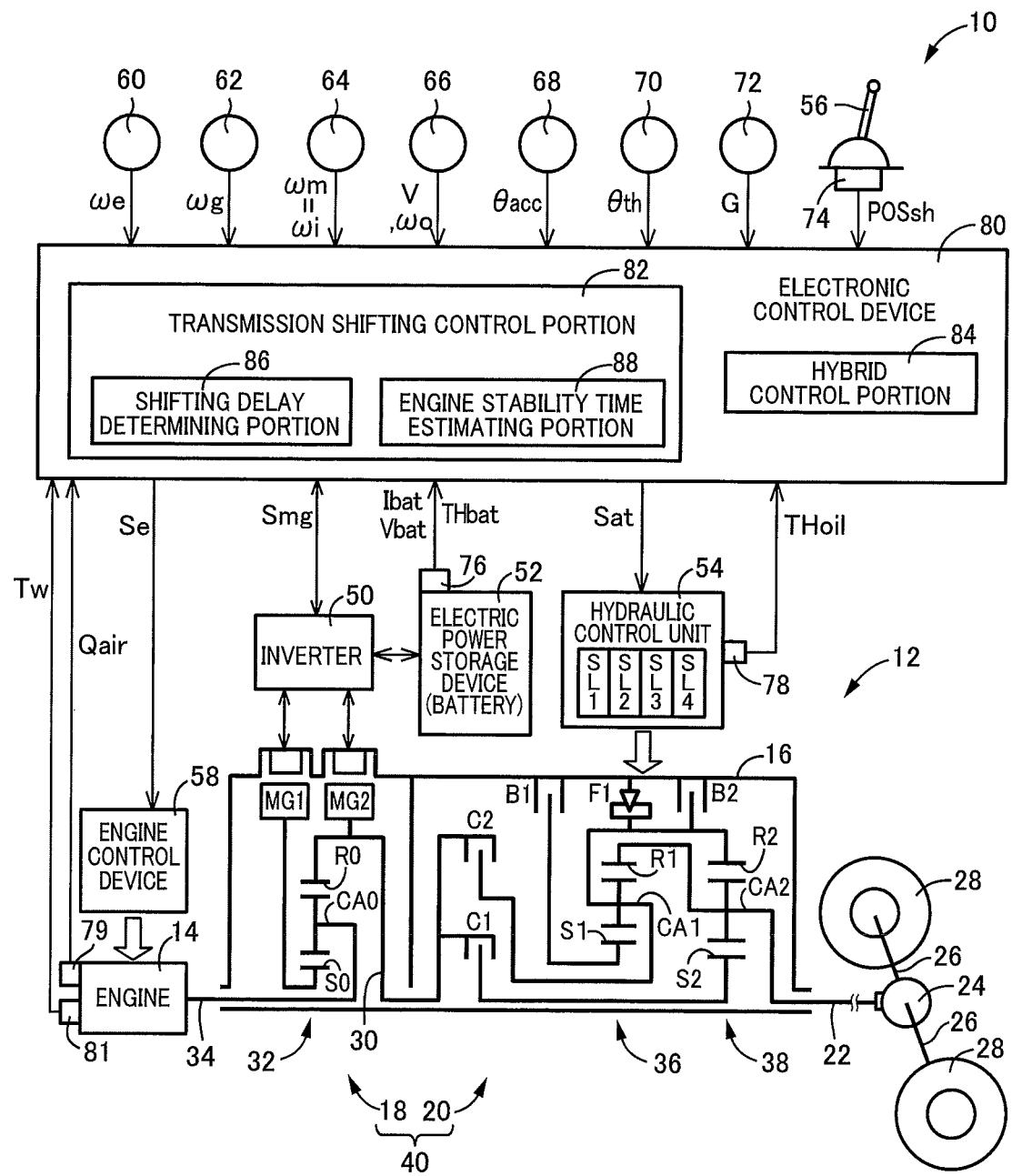
FIG. 1 is a schematic view showing an arrangement of one example of a vehicular drive system to be controlled by a control apparatus according to one embodiment of the present invention, and major control functions and control portions of the control apparatus.

The length of time of stability of the output state of the engine is estimated on the basis of at least one of parameters consisting of: an output torque of the engine or a value relating to the engine torque, at a moment of determination to implement the power-on shift-down action; a required output torque of the engine or a value relating to the required engine torque, at the moment of determination to implement the power-on shift-down action; and a value relating to a control response of the engine torque. Alternatively, the length of time of stability of the output state of the engine is estimated on the basis of at least one of parameters consisting of: an output power of the engine or a value relating to the engine power, at the moment of determination to implement the power-on shift-down action; a required output power of the engine or a value relating to the required engine power; and a value relating to a control response of the engine power. In this case, a length of time up to a moment of stabilization of the output state of the engine can be accurately determined on the basis of those parameters.

The predetermined value described above with respect to the length of time of stability is set on the basis of at least one of parameters consisting of an operating temperature of a working fluid to be supplied to a coupling device of the step-variable transmission to implement its power-on shift-down action; an input torque of the step-variable transmission; and a running speed of the vehicle. In this case, a length of time up to a moment of initiation of an inertia phase of the power-on shift-down action of the step-variable transmission can be accurately determined on the basis of at least one of those parameters.

The "shift-down command" described herein corresponds to hydraulic control commands to be applied to a hydraulic control unit provided to control hydraulic pressures of coupling devices of the step-variable transmission. That is, the shift-down action of the step-variable transmission is initiated when the hydraulic control commands (shift-down command) are applied to the hydraulic control unit.

The "output state" of the engine described herein is interpreted to include a state of an output torque of the engine and a state of an output power of the engine, and the output state of the engine is considered to be stabilized when a rate of rise of the output torque of the engine is not higher than a predetermined upper limit, or when a rate of rise of the output power of the engine is not higher than a predetermined upper limit.

Referring to the drawings, preferred embodiments of the present invention will be described in detail. It is to be understood that the drawings are simplified and transformed as needed, and do not necessarily accurately represent dimensions and shapes of various elements of the embodiments.

First Embodiment

Reference is first made to FIG. 1, which is the schematic view showing an arrangement of a drive system 12 of a vehicle 10 to be controlled by a control apparatus according to the present invention, and major portions of the control apparatus to perform various controls of the vehicle 10. As shown in FIG. 1, the vehicular drive system 12 is provided with an engine 14 functioning as a drive power source, an electrically controlled continuously variable transmission 18 (hereinafter referred to as "continuously variable transmission 18") connected directly or indirectly via a damper (not shown) or any other device to the engine 14, and a mechanically operated step-variable transmission 20 (hereinafter referred to as "step-variable transmission 20") connected to an output rotary member of the continuously variable transmission 18. The continuously variable transmission 18 and the step-variable transmission 20 are disposed in series with each other within a transmission casing 16 (hereinafter referred to as "casing 16") functioning as a non-rotatable member fixed to a vehicle body, such that the transmissions 18 and 20 are disposed coaxially with each other on a common axis. The vehicular drive system 12 is further provided with a differential gear mechanism 24 connected to an output rotary member of the step-variable transmission 20 in the form of an output shaft 22, and a pair of axles 26 connected to the differential gear mechanism 24. In the vehicular drive system 12, a drive force ("drive torque" or "drive power" unless otherwise distinguished from the drive force) of the engine 14 and a second motor/generator MG2 (described below) is transmitted to the step-variable transmission 20, and is transmitted from the step-variable transmission 20 to drive wheels 28 of the vehicle 10 through the differential gear mechanism 24 and other devices. The vehicular drive system 12 is suitably used in the vehicle 10 of an FR type (front-engine rear-drive type) in which the axis of the engine 14 is parallel to the longitudinal direction of the vehicle 10. It is noted that the continuously variable transmission 18 and the step-variable transmission 20 are constructed substantially symmetrically with each other about the axis of the engine 14 (about the above-indicated common axis), and that FIG. 1 does not show the lower halves of the transmissions 18 and 20.

The engine 14 is the drive power source to drive the vehicle 10, which is a known internal combustion engine such as a gasoline engine or a diesel engine. An engine torque Te, which is an output torque of this engine 14, is controlled by an electronic control device 80 (described below) which controls the operating condition of the engine 14 as represented by an opening angle θth of a throttle valve or an intake air quantity, an amount of injection of a fuel and an ignition timing. In the present embodiment, the engine 14 is connected to the continuously variable transmission 18, without a fluid-operated type power transmitting device such as a torque converter or a fluid coupling being disposed between the engine 14 and the transmission 18.

The continuously variable transmission 18 is provided with: a first motor/generator MG1; a differential mechanism 32 functioning as a power distributing device to mechanically distribute the drive force of the engine 14 to the first motor/generator MG1, and to an intermediate power transmitting member 30 which is an output rotary member of the continuously variable transmission 18; and the second motor/generator MG2 operatively connected to the intermediate power transmitting member 30. The continuously variable transmission 18 is an electrically controlled continuously variable transmission wherein a differential state of the differential mechanism 32 is controllable by controlling an operating state of the first motor/generator MG1. The first motor/generator MG1 functions as a differential motor/generator (a differential motor) while the second motor/generator MG2 is a motor/generator (an electric motor) which functions as a drive power source, namely, a vehicle driving motor/generator. The vehicle 10 is a hybrid vehicle provided with the drive power source in the form of the engine 14 and the second motor/generator MG2.

In the continuously variable transmission 18, a drive force generated by the engine 14 is distributed to the first motor/generator MG1 and the intermediate power transmitting member 30. Further, a part or an entirety of an electric power generated by the first motor/generator MG1 is supplied to the second motor/generator MG2. The second motor/generator MG2 is operated with at least one of the electric power supplied from the first motor/generator MG1 and an electric power supplied from a battery 52, and a drive force generated by the second motor/generator MG2 is transmitted to the intermediate power transmitting member 30. The drive force transmitted to the intermediate power transmitting member 30 is received by the step-variable transmission 20. Thus, the vehicle 10 is a hybrid vehicle provided with the drive power source in the form of the engine 14 and the second motor/generator MG2. In the present embodiment, the engine 14, and the continuously variable transmission 18 constituted by the differential mechanism 32, the first motor/generator MG1 and the second motor/generator MG2 cooperate to function as the drive power source.

Each of the first motor/generator MG1 and the second motor/generator MG2 is an electrically operated rotary device having a function of an electric motor and a function of an electric generator. The first motor/generator MG1 and the second motor/generator MG2 are connected to an electric power storage device in the form of a battery 52 through an inverter 50. The inverter 50 provided on the vehicle 10 is controlled by the control apparatus in the form of the above-indicated electronic control device 80 described below in detail, to control an output torque (regenerative torque) of the first motor/generator MG1, namely, an MG1 torque Tg, and an output torque (forward driving torque) of the second motor/generator MG2, namely, an MG2 torque Tm. The battery 52 also provided on the vehicle 10 is the electric power storage device to and from which an electric power is supplied from and to the first motor/generator MG1 and the second motor/generator MG2.

The differential mechanism 32 is a planetary gear set of a single-pinion type having a sun gear S0, a carrier CA0 and a ring gear R0. The carrier CA0 is operatively connected to the engine 14 through a connecting shaft 34 in a power transmittable manner, and the sun gear S0 is operatively connected to the first motor/generator MG1 in a power transmittable manner, while the ring gear R0 is operatively connected to the second motor/generator MG2 in a power transmittable manner. In the differential mechanism 32, the carrier CA0 functions as an input rotary element, and the sun gear S0 functions as a reaction rotary element, while the ring gear R0 functions as an output rotary element.

The step-variable transmission 20 is a mechanically operated transmission mechanism which constitutes a part of a power transmitting path between the intermediate power transmitting member 30 and the drive wheels 28. The intermediate power transmitting member 30 also functions as an input rotary member of the step-variable transmission 20. The step-variable transmission 20 is a known automatic transmission of a planetary gear type which is provided with a plurality of planetary gear sets in the form of a first planetary gear set 36 and a second planetary gear set 38, and a plurality of coupling devices in the form of a clutch C1, a clutch C2, a brake B1 and a brake B2 (hereinafter referred to as "coupling devices CB" unless otherwise specified), and which is shifted with engaging and releasing actions of the coupling devices CB.

Each of the coupling devices CB is a hydraulically operated frictional coupling device in the form of a multiple-disc type or a single-disc type clutch or brake that is operatively pressed by a hydraulic actuator, or a band brake that is operatively tightened by a hydraulic actuator. The coupling devices CB are selectively placed in engaged, slipping or released states with their torque capacities (engaging torque values or CB-transmitted torque values) Tcb being changed according to engaging hydraulic pressures PRcb applied thereto, which are regulated by respective solenoid-operated valves SL1-SL4 incorporated within a hydraulic control unit 54. In order for each coupling device CB to be able to transmit a torque (for example, an AT input torque Ti which is an input torque of the step-variable transmission 20) between the intermediate power transmitting member 30 and the output shaft 22, without a slipping action (without a speed difference between input and output elements of the coupling device CB), the relevant coupling device CB should be given an engaging torque Tcb enough to permit transmission of a component of the input torque, which is assigned to be transmitted by the coupling device CB in question, that is, to permit transmission of an assigned torque (CB-transmitted torque) to be transmitted through an engaging action of the coupling device CB. However, it is noted that an increase of the engaging torque Tcb enough to obtain the CB-transmitted torque does not cause an increase of the CB-transmitted torque. That is, the engaging torque Tcb is equivalent to a maximum value of the torque that can be transmitted through the coupling device CB, and the CB-transmitted torque is equivalent to the torque that is actually transmitted through the coupling device CB. It is noted that the engaging torque (CB-transmitted torque) Tcb and the engaging hydraulic pressure PRcb are proportional to each other, before the engaging hydraulic pressure PRcb has been raised to initiate an engaging contact of the input and output elements with each other.

In the step-variable transmission 20, selected ones of rotary elements (sun gears S1 and S2, carriers CA1 and CA2, and ring gears R1 and R2) of the first and second planetary gear sets 36 and 38 are connected to each other or to the intermediate power transmitting member 30, casing 16 or output shaft 22, either directly or indirectly (selectively) through the coupling devices CB or a one-way clutch F1.

The step-variable transmission 20 is a step-variable automatic transmission which is shifted to a selected one of four gear positions (speed positions) by engaging actions of selected ones of the coupling devices CB. These four gear positions have respective different speed ratios γat (=input shaft speed ωi/output shaft speed ωo). Namely, the step-variable transmission 20 is a step-variable automatic transmission which is shifted up and down from one gear position to another by placing selected ones of the coupling devices CB in the engaged state. In the present embodiment, the gear positions of the step-variable transmission 20 are referred to as "AT gear positions". The input shaft speed ωi is a rotating speed (angular velocity) of the input shaft of the step-variable transmission 20, that is, a rotating speed of the intermediate power transmitting member 30, which is equal to an MG2 speed ωm which is an operating speed of the second motor/generator MG2, which is operatively connected to the step-variable transmission 20 in a power transmittable manner. Namely, the input shaft speed ωi can be represented by the MG2 speed ωm. The output shaft speed ωo is a rotating speed of the output shaft 22 of the step-variable transmission 20, which is considered to be an output shaft speed of a transmission device 40 which consists of the continuously variable transmission 18 and the step-variable transmission 20.

Figures 2, 3:
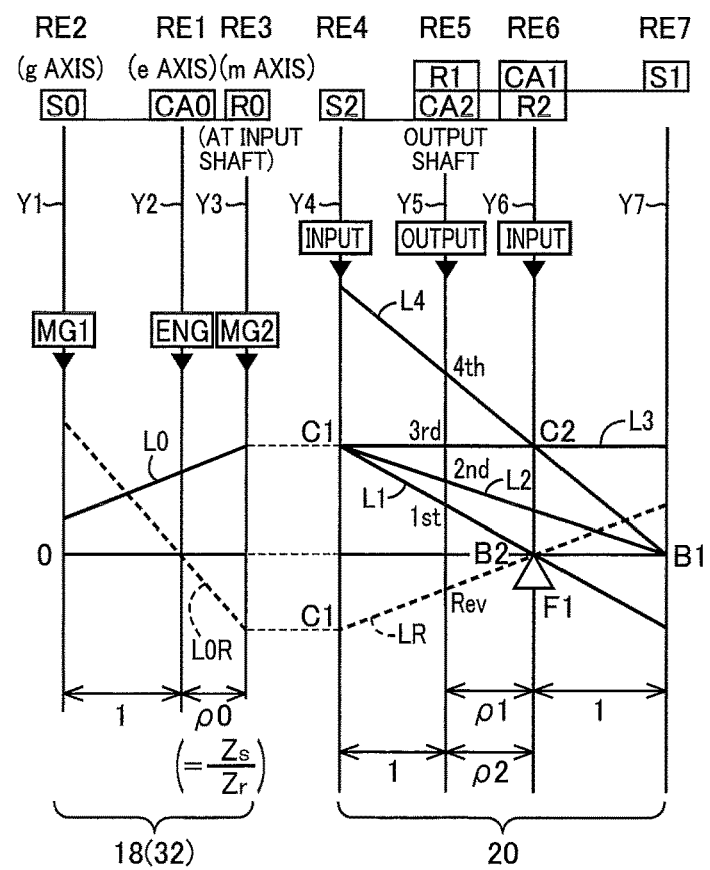
FIG. 2 is a table indicating a relationship between AT gear positions of a mechanically operated step-variable transmission shown in FIG. 1 and combinations of coupling devices placed in engaged states to establish the respective gear positions.
FIG. 3 is a collinear chart indicating a relationship among rotating speeds of rotary elements of an electrically controlled continuously variable transmission and the mechanically operated step-variable transmission.

Reference is now made to FIG. 2, which is the table indicating the relationship between the first through fourth speed AT gear positions of the step-variable transmission 20 shown in FIG. 1 and combinations of the coupling devices CB placed in the engaged states to establish the respective AT gear positions. In the table, the four forward AT gear positions are respectively represented by "$1^{st}$", "$2^{nd}$", "$3^{rd}$" and "$4^{th}$". The first speed AT gear position "$1^{st}$" has a highest speed ratio γat, and the speed ratios γat of the four AT gear positions decrease in the direction from the first speed AT gear position (lowest-speed gear position) "1st" toward the fourth speed AT gear position (highest-speed gear position) "$4^{th}$". In the table, "O" indicates the engaged state of the coupling devices CB, "Δ" indicates the engaged state of the coupling device B2 during application of an engine brake to the vehicle 10 or during a shift-down action of the step-variable transmission 20 while the vehicle 10 is in a coasting run, while the blank indicates the released state of the coupling devices CB. The one-way clutch F1 indicated above is disposed in parallel to the brake B2 which is placed in the engaged state to establish the first speed AT gear position "$1^{st}$", so that the brake B2 is not required to be placed in the engaged state upon starting or acceleration of the vehicle 10. The above-indicated shift-down action of the step-variable transmission 20 in the coasting run of the vehicle 10 is a kind of a "power-off shift-down action" which is required as a result of reduction of a vehicle-speed-related value (vehicle running speed V, for example) due to reduction of a required drive force (as represented by an operation amount θacc of an accelerator pedal by a driver (operator) of the vehicle 10) or during deceleration of the vehicle 10 in a released or non-operated position of the accelerator pedal (with the operation amount θacc of the accelerator pedal being zero or substantially zero), and is a shift-down action which is required during deceleration of the vehicle 10 in the released position of the accelerator pedal. It is noted that the step-variable transmission 20 is placed in a neutral position (a power transmission cutoff state) when all of the coupling devices CB are placed in the released states.

The step-variable transmission 20 is shifted up or down to establish a newly selected one of the four AT gear positions, according to the operation amount θacc of the accelerator pedal and the vehicle running speed V, with a releasing action of one of the coupling devices CB and a concurrent engaging action of another coupling device CB, which concurrent releasing and engaging actions are controlled by the above-indicated electronic control device 80, more specifically, by a transmission shifting control portion 82 configured to control shifting actions of the step-variable transmission 20. The above-indicated one coupling device CB was placed in the engaged state before the step-variable transmission 20 is shifted to establish the newly selected AT gear position, while the above-indicated another coupling device CB is placed in the engaged state while the step-variable transmission 20 is placed in the newly selected AT gear position. Thus, the step-variable transmission 20 is shifted up or down from one of the AT gear positions to another by so-called "clutch-to-clutch" shifting operation, namely, concurrent releasing and engaging actions of the selected two coupling devices CB. For instance, the step-variable transmission 20 is shifted down from the second speed AT gear position "$2^{nd}$" to the first speed AT gear position "$1^{st}$", with the releasing action of the brake B1, that is an engaging device to be released during the shift-down, and the concurrent engaging action of the brake B2, that is an engaging device to be engaged during the shift-down, as indicated in the table of FIG. 2. In this instance, the hydraulic pressures applied to the brakes B1 and B2 are transiently controlled to bring these brakes B1 and B2 into the released and engaged states, respectively.

The collinear chart of FIG. 3 indicates a relationship among rotating speeds of the rotary elements of the continuously variable transmission 18 and the step-variable transmission 20. In this collinear chart, three vertical lines Y1, Y2 and Y3 corresponding to the respective three rotary elements of the differential mechanism 32 of the continuously variable transmission 18 respectively represent a "g" axis representing the rotating speed of the second rotary element RE2 in the form of the sun gear S0, an "e" axis representing the rotating speed of the first rotary element RE1 in the form of the carrier CA0, and an "m" axis representing the rotating speed of the third rotary element RE3 in the form of the ring gear R0 (i.e., the input shaft rotating speed of the step-variable transmission 20). Further, four vertical lines Y4, Y5, Y6 and Y7 corresponding to the respective four rotary elements of the step-variable transmission 20 respectively represent an axis representing the rotating speed of the fourth rotary element RE4 in the form of the sun gear S2, an axis representing the rotating speed of the fifth rotary element RE5 in the form of the ring gear R1 and the carrier CA2 fixed to each other, namely, the rotating speed of the output shaft 22, an axis representing the rotating speed of the sixth rotary element RE6 in the form of the carrier CA1 and the ring gear R2 fixed to each other, and an axis representing the rotating speed of the seventh rotary element RE7 in the form of the sun gear S1. The distances between the adjacent ones of the vertical lines Y1, Y2 and Y3 are determined by a gear ratio ρ0 of the differential mechanism 32, while the distances between the adjacent ones of the vertical lines Y4-Y7 are determined by gear ratios ρ1 and ρ2 of the respective first and second planetary gear sets 36 and 38. Where the distance between the axis representing the rotating speed of the sun gear S0, S1, S2 and the axis representing the rotating speed of the carrier CA0, CA1, CA2 corresponds to "1", the distance between the axis representing the rotating speed of the carrier CA0, CA1, CA2 and the axis representing the rotating speed of the ring gear R0, R1, R2 corresponds to the gear ratio ρ of the planetary gear set (=number of teeth Zs of the sun gear/number of teeth Zr of the ring gear).

Referring to the collinear chart of FIG. 3, the differential mechanism 32 of the continuously variable transmission 18 is arranged such that the engine 14 (represented as "ENG" in the collinear chart) is operatively connected to the first rotary element RE1 in a power transmittable manner, and the first motor/generator MG1 (represented as "MG1" in the collinear chart) is operatively connected to the second rotary element RE2 in a power transmittable manner, while the second motor/generator MG2 (represented as "MG2" in the collinear chart) is operatively connected in a power transmittable manner to the third rotary element RE3 which is rotated together with the intermediate power transmitting member 30. Thus, a rotary motion of the engine 14 is transmitted to the step-variable transmission 20 through the intermediate power transmitting member 30. In a part of the collinear chart corresponding to the continuously variable transmission 18, straight lines L0 and L0R intersecting the vertical line Y2 represent a relationship between the rotating speeds of the sun gear S0 and the ring gear R0.

The step-variable transmission 20 is arranged such that the fourth rotary element RE4 is selectively connected to the intermediate power transmitting member 30 through the clutch C1, the fifth rotary element RE5 is connected to the output shaft 22, the sixth rotary element RE6 is selectively connected to the intermediate power transmitting member 30 through the clutch C2 and is selectively connected to the casing 16 through the brake B2, and the seventh rotary element RE7 is selectively connected to the casing 16 through the brake B1. In a part of the collinear chart corresponding to the step-variable transmission 20, straight lines L1, L2, L3, L4 and LR intersecting the vertical line Y5 represent the rotating speeds of the output shaft 22 in the respective first, second, third, fourth speed and reverse drive AT gear positions "$1^{st}$", "$2^{nd}$", "$3^{rd}$", "$4^{th}$" and "Rev" that are selectively established by control for engaging and releasing the coupling devices CB.

Solid straight lines L0, L1, L2, L3 and L4 shown in the collinear chart of FIG. 3 indicate the relative rotating speeds of the rotary elements in a hybrid drive mode in which the vehicle 10 is driven in the forward direction with at least the engine 14 being operated as a drive power source. In the differential mechanism 32 during this hybrid drive mode, when a torque Te of the engine 14 (engine torque Te) is applied to the carrier CA0 while a reaction torque which is a negative torque generated by the first motor/generator MG1 operated in the positive direction is applied to the sun gear S0, a directly transmitted engine torque Td (=Te/(1+ρ) =-(1/ρ)*Tg) which is a positive torque is applied to the ring gear R0 and rotating the ring gear R0 in the positive direction. The vehicle 10 is driven in the forward direction with a vehicle drive torque which is a sum of the directly transmitted engine torque Td and the MG2 torque Tm and which is transmitted to the drive wheels 28 through the step-variable transmission 20 selectively placed in one of the first through fourth speed AT gear positions according to required vehicle drive force. At this time, the first motor/generator MG1 functions as an electric generator operated in the positive direction and generating a negative torque. An electric power Wg generated by the first motor/generator MG1 is stored in the battery 52 or consumed by the second motor/generator MG2. The second motor/generator MG2 is operated to generate the MG2 torque Tm, with all or a part of the electric power Wg generated by the first motor/generator MG1, or a sum of the generated electric power Wg and the electric power supplied from the battery 52.

In the differential mechanism 32 during a motor drive mode in which the vehicle 10 is driven with a drive force generated by the second motor/generator MG2 operated as a drive power source while the engine 14 is held at rest, the carrier CA0 is held stationary while the MG2 torque Tm which is a positive torque is applied to the ring gear R0 and rotating the ring gear R0 in the positive direction. The state of the differential mechanism in this motor drive mode is not shown in the collinear chart of FIG. 3. At this time, the first motor/generator MG1 connected to the sun gear S0 is placed in a non-load state and freely operated in the negative direction. Namely, in the motor drive mode, the engine 14 is held in a non-operated state, so that an operating speed ωe of the engine 14 (engine speed ωe) is kept zero, and the vehicle 10 is driven in the forward direction with the MG2 torque Tm (positive forward driving torque), which is transmitted as a forward drive torque to the drive wheels 28 through the step-variable transmission 20 placed in one of the first through fourth speed AT gear positions.

Broken straight lines L0R and LR shown in the collinear chart of FIG. 3 indicate the relative rotating speeds of the rotary elements in a motor drive mode in which the vehicle 10 is driven in the rearward direction. During driving of the vehicle 10 in the rearward direction in this motor drive mode, the MG2 torque Tm which is a negative torque generated by the second motor/generator MG2 operated in the negative direction is applied to the ring gear R0, and is transmitted to the drive wheels 28 as a drive torque to drive the vehicle 10 in the rearward direction, through the step-variable transmission 20 placed in the first speed AT gear position. To drive the vehicle 10 in the rearward direction, the electronic control device 80 described below is configured to command the second motor/generator MG2 to generate the reverse driving MG2 torque Tm (negative reverse driving torque) opposite to the forward driving MG2 torque Tm (positive forward driving torque), while the step-variable transmission 20 is placed in a low-speed AT gear position (first speed AT gear position, for example). Thus, the vehicle 10 is driven in the rearward direction with the reverse (negative) MG2 torque Tm while the step-variable transmission 20 is placed in one of the forward drive AT gear positions. In the hybrid drive mode, too, the second motor/generator MG2 can be operated in the negative direction as indicated by the straight line L0R, so that the vehicle 10 can be driven in the rearward direction in the hybrid drive mode, as well as in the motor drive mode.

In the vehicular drive system 12, the continuously variable transmission 18 functions as an electrically controlled shifting mechanism (electrically controlled differential mechanism) provided with the differential mechanism 32 the differential state of which is controlled by controlling the operating state of the first motor/generator MG1, and which has the three rotary elements, that is, the first rotary element RE1 in the form of the carrier CA0 to which the engine 14 is operatively connected in a power transmittable manner, the second rotary element RE2 in the form of the sun gear S0 to which the first motor/generator MG1 is operatively connected in a power transmittable manner, and the third rotary element RE3 in the form of the ring gear R0 to which the intermediate power transmitting member 30 is connected (in other words, the second motor/generator MG2) is operatively connected. Namely, the continuously variable transmission 18 has the differential mechanism 32 to which the engine 14 is operatively connected in a power transmittable manner, and the first motor/generator MG1 to which the differential mechanism 32 is operatively connected in a power transmittable manner, and the operating state of which is controlled to control the differential state of the differential mechanism 32. The continuously variable transmission 18 is operated as an electrically controlled continuously variable transmission a speed ratio $\gamma 0$ ($=\omega e/\omega m$) of which is variable. The speed ratio $\gamma 0$ is a ratio of rotating speed of the connecting shaft 34 (namely, engine speed $\omega e$) to the rotating speed of the intermediate power transmitting member 30 (namely, MG2 speed $\omega m$).

In the hybrid drive mode, for instance, the rotating speed of the sun gear S0 is raised or lowered by controlling an operating speed of the first motor/generator MG1 while the rotating speed of the ring gear R0 is determined by the rotating speed of the drive wheels 28 with the step-variable transmission 20 placed in one of the AT gear positions, so that the rotating speed of the carrier CA0 (namely, engine speed $\omega e$) is accordingly raised or lowered. In running with operation of the engine 14, therefore, the engine 14 can be operated at an efficient operating point. That is, the step-variable transmission 20 to be placed in a selected one of the AT gear positions and the continuously variable transmission 18 functioning as a continuously variable transmission cooperate to provide the transmission device 40 in which the continuously variable transmission 18 (differential mechanism 32) and the step-variable transmission 20 are disposed in series with each other and which functions as a continuously variable transmission as a whole.

Alternatively, the continuously variable transmission 18 can be shifted like a step-variable transmission. Accordingly, the transmission device 40 constituted by the step-variable transmission 20 to be placed in one of the AT gear positions and the continuously variable transmission 18 which can be shifted like the step-variable transmission can be shifted like a step-variable transmission as a whole. That is, the step-variable transmission 20 and the continuously variable transmission 18 can be controlled to selectively establish a plurality of speed positions (hereinafter referred to as "overall speed positions" although it may be referred also to as "conceptual speed positions") having respective different values of a speed ratio $\gamma t$ ($=\omega e/\omega o$) which is a ratio of the engine speed $\omega e$ to the output shaft speed $\omega$. The speed ratio $\gamma t$ is an overall speed ratio of the transmission device 40 consisting of the continuously variable transmission 18 and the step-variable transmission 20 which are disposed in series with each other. The overall speed ratio $\gamma t$ is equal to a product of the speed ratio $\gamma 0$ of the continuously variable transmission 18 and the speed ratio $\gamma at$ of the step-variable transmission 20, namely, $\gamma t = \gamma 0 * \gamma at$.

Figures 4, 5:
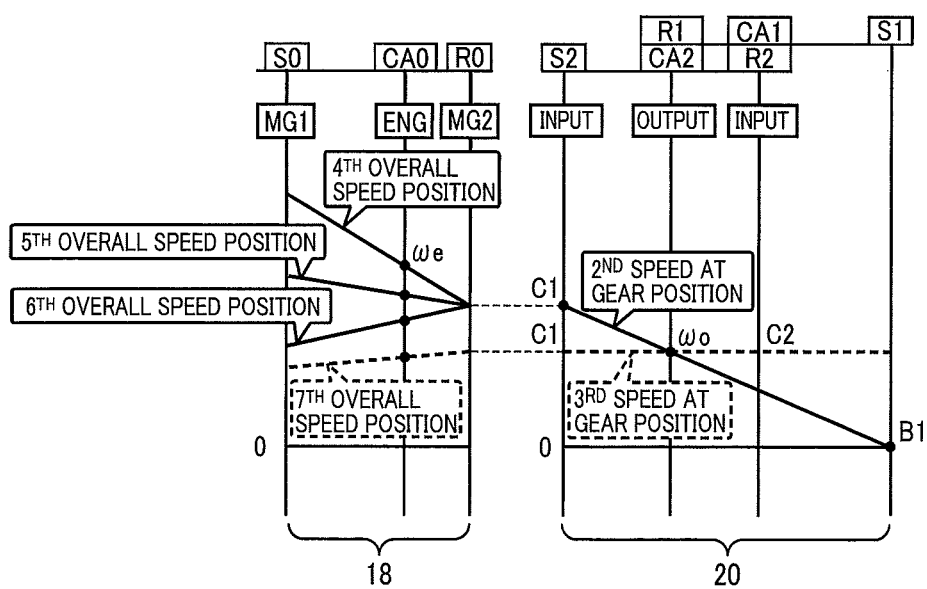
FIG. 4 is a table indicating an example of a plurality of overall speed positions of a transmission device in relation to the AT gear positions of the step-variable transmission.
FIG. 5 is a view indicating some examples of the AT gear positions of the step-variable transmission and some examples of the overall speed positions of the transmission device, on a collinear chart similar to that of FIG. 3.

At least one overall speed position is provided for each of the four AT gear positions of the step-variable transmission 20, with a combination of each AT gear position with at least one of the different speed ratio values $\gamma 0$ of the continuously variable transmission 18. FIG. 4 is the table indicating an example of the overall speed positions of the transmission device 40, wherein the first through third overall speed positions are established for the first speed AT gear position, the fourth through sixth overall speed positions are established for the second speed AT gear position, the seventh through ninth overall speed positions are established for the third speed AT gear position, and the tenth overall speed position is established for the fourth speed AT gear position.

FIG. 5 is the view indicating some examples of the AT gear positions of the step-variable transmission 20 and some examples of the overall speed positions of the transmission device 40, on a collinear chart similar to that of FIG. 3. In FIG. 5, solid lines indicate the fourth through sixth overall speed positions established when the step-variable transmission 20 is placed in the second speed AT gear position. In the transmission device 40, the continuously variable transmission 18 is controlled to control the engine speed $\omega e$ with respect to the output shaft speed $\omega o$ for establishing the predetermined overall speed ratio values $\gamma t$, to thereby establish the different overall speed position or positions for each of the AT gear positions. A broken line indicates the seventh overall speed position established when the step-variable transmission 20 is placed in the third speed AT gear position. In the transmission device 40, the continuously variable transmission 18 is controlled according to the selected one of the AT gear positions, for shifting the transmission device 40 from one of the overall speed positions to another.

The vehicle 10 is provided with the control apparatus in the form of the electronic control device 80 configured to control various devices of the vehicle 10 such as the engine 14, continuously variable transmission 18 and step-variable transmission 20. FIG. 1 is the view showing input and output signals of the electronic control device 80, and is a functional block diagram showing major control functions and control portions of the electronic control device 80. For example, the electronic control device 80 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control device 80 may be constituted by two or more control units exclusively assigned to perform different control operations such as engine control operations and transmission shifting control operations.

The electronic control device 80 is configured to receive various input signals from various sensors provided on the vehicle 10, such as: an output signal of an engine speed sensor 60 indicative of the engine speed $\omega e$; an output signal of an MG1 speed sensor 62 indicative of the MG1 speed $\omega g$ which is the operating speed of the first motor/generator MG1; an output signal of an MG2 speed sensor 64 indicative of the MG2 speed $\omega m$ which is the input shaft speed $\omega i$; an output signal of an output shaft speed sensor 66 indicative of the output shaft speed $\omega o$ corresponding to the vehicle running speed V; an output signal of an accelerator pedal operation amount sensor 68 indicative of the operation amount $\theta acc$ of a vehicle accelerating member in the form of the accelerator pedal, which operation amount $\theta acc$ represents a degree of acceleration of the vehicle 10 required by the vehicle operator; an output signal of a throttle valve opening angle sensor 70 indicative of an angle $\theta th$ of opening of an electronic throttle valve; an output signal of an acceleration (G) sensor 72 indicative of a longitudinal acceleration value G of the vehicle 10; an output signal of a shift position sensor 74 indicative of an operating position POSsh of a manually operated shifting member in the form of a shift lever 56 provided on the vehicle 10; an output signal of a battery sensor 76 indicative of a temperature THbat, a charging/discharging electric current Ibat and a voltage Vbat of the battery 52; an output signal of an oil temperature sensor 78 indicative of a temperature THoil of a working fluid used for operating hydraulic actuators of the coupling devices CB; an output signal of an intake air quantity sensor 79 indicative of an intake air quantity Qair of the engine 14; and an output signal of a cooling water temperature sensor 81 indicative of a temperature Tw of a cooling water of the engine 14.

Further, the electronic control device 80 generates various output signals to the various devices provided on the vehicle 10, such as: an engine control command signal Se to be applied to an engine control device 58 provided to control a throttle actuator, a fuel injecting device and an ignition device, for controlling the engine 14; motor/generator control command signals Smg to be applied to the inverter 50, for controlling the first motor/generator MG1 and the second motor/generator MG2; and hydraulic control command signals Sat to be applied to the hydraulic control unit 54 provided to control the operating states of the coupling devices CB (namely, for controlling the shifting actions of the step-variable transmission 20). The hydraulic control command signals Sat are command signals (drive currents) to be applied to the hydraulic control unit 54 for controlling amounts of electric currents to be applied to the solenoid-operated valves SL1-SL4 which regulate the engaging hydraulic pressure PRcb to be applied to each of the hydraulic actuators of the coupling devices CB. The electronic control device 80 operates to set a hydraulic pressure command value (command pressure) corresponding to the engaging hydraulic pressure PRcb to be applied to each of the hydraulic actuators, for establishing a target value of the engaging torque Tcb of the corresponding coupling device CB, and outputs a drive current as a hydraulic control command corresponding to the hydraulic pressure command value.

The electronic control device 80 is configured to calculate a charging state (stored electric power amount) SOC (%) of the battery 52 on the basis of the charging/discharging electric current Ibat and the voltage Vbat of the battery 52. The electronic control device 80 is further configured to calculate, based on, for example, the temperature THbat and the charging state SOC of the battery 52, a maximum charging amount Win of electric power that can be stored in the battery 52, and a maximum discharging amount Wout of electric power that can be discharged from the battery 52, which maximum charging and discharging amounts Win and Wout define a range of an electric power Pbat of the battery 52 that can be used. The calculated maximum charging and discharging amounts Win and Wout decrease with a decrease of the battery temperature THbat when the battery temperature THbat is lower than a normal level, and decrease with an increase of the battery temperature THbat when the battery temperature THbat is higher than the normal level. Further, the maximum charging amount Win decreases with an increase of the stored electric power amount SOC when the stored electric power amount SOC is relatively large. The maximum discharging amount Wout decreases with a decrease of the stored electric power amount SOC when the stored electric power amount SOC is relatively small.

The electronic control device 80 includes a transmission shifting control portion 82 functioning as shifting control means, and a hybrid control portion 84 functioning as hybrid control means, for performing various controls of the vehicle 10.

The transmission shifting control portion 82 is configured to determine a shifting action of the step-variable transmission 20 according to a memory-stored AT gear position shifting map obtained by experimentation or determined by an appropriate design theory, and applies the hydraulic control command signals Sat to the hydraulic control unit 54, for commanding the solenoid-operated valves SL1-SL4 to bring the appropriate ones of the coupling devices CB into the released and engaged states, for automatically shifting up or down the step-variable transmission 20. The AT gear position shifting map is a predetermined relationship having shifting lines (shift-up boundary lines and shift-down boundary lines) used to determine whether the step-variable transmission 20 should be shifted up or down. These shifting lines are defined in a two-dimensional coordinate system in which the output shaft speed $\omega o$ (equivalent to the vehicle running speed V) and the accelerator pedal operation amount $\theta acc$ (equivalent to a required drive torque Tdem or throttle valve opening angle $\theta th$) are taken as two variables along respective two axes.

The hybrid control portion 84 has a function of an engine control means or portion to control the engine 14, and a function of a motor/generator control means or portion to control the first motor/generator MG1 and the second motor/generator MG2 through the inverter 50. Thus, the hybrid control portion 84 performs hybrid drive controls for controlling the engine 14, first motor/generator MG1 and second motor/generator MG2. The hybrid control portion 84 is configured to calculate a required vehicle drive power Pdem on the basis of the accelerator pedal operation amount $\theta acc$ and the vehicle running speed V, and according to a predetermined relationship in the form of a drive force map, for instance. In other words, the hybrid control portion 84 calculates the required drive torque Tdem at the present vehicle running speed V. The hybrid control portion 84 generates the engine control command signal Se to control the engine 14, and the motor/generator control command signals Smg to control the first motor/generator MG1 and the second motor/generator MG2, for establishing the required vehicle drive power Pdem, while taking account of the maximum charging and discharging amounts Win and Wout of electric power of the battery 52. For example, the engine control command signal Se represents a command target value of an engine power Pe (engine output Pe) which is a power of the engine 14 (required engine power Pedem) outputting the engine torque Te at its present operating speed $\omega e$. For example, the motor/generator control command signals Smg represent a command value of an electric power amount Wg to be generated by the first motor/generator MG1 to generate the reaction torque acting against the engine torque Te, namely, the MG1 torque Tg at the present MG1 speed $\omega g$, and a command value of an electric power amount Wm to be consumed by the second motor/generator MG2 to generate the MG2 torque Tm at the present MG2 speed $\omega m$.

When the transmission device 40 as a whole is operated as the continuously variable transmission while the continuously variable transmission 18 is operated as the continuously variable transmission, for instance, the hybrid control portion 84 controls the engine 14 and the electric power amount Wg to be generated by the first motor/generator MG1, so as to establish the engine speed $\omega e$ and the engine torque Te for obtaining the engine power Pe to establish the required vehicle drive power Pdem, while taking account of a highest fuel economy point of the engine 14, so that the speed ratio γ0 of the continuously variable transmission 18 is controlled so as to be continuously varied. As a result, the speed ratio γt of the transmission device 40 is controlled while the continuously variable transmission 18 is operated as the continuously variable transmission.

When the transmission device 40 as a whole is operated as the step-variable transmission while the continuously variable transmission 18 is operated as the step-variable transmission, for instance, the hybrid control portion 84 determines a shifting action of the transmission device 40 according to an overall speed position shifting map, for example, and performs a shifting control of the continuously variable transmission 18 to establish a selected one of the plurality of overall speed positions, in cooperation with the transmission shifting control portion 82 to shift the step-variable transmission 20 selectively to the AT gear positions. The plurality of overall speed positions can be established by controlling the first motor/generator MG1 to control the engine speed ωe according to the output shaft speed ωo so as to maintain the respective speed ratio values γt. It is noted that the speed ratio γt in each of the overall speed positions does not necessarily have to be constant over all ranges of the output shaft speed ωo, but may be changed in a predetermined range or ranges of the output shaft speed ωo or may be given a limitation or limitations, for example, depending on upper and lower limits of rotating speeds of respective rotatable elements.

Figure 6:
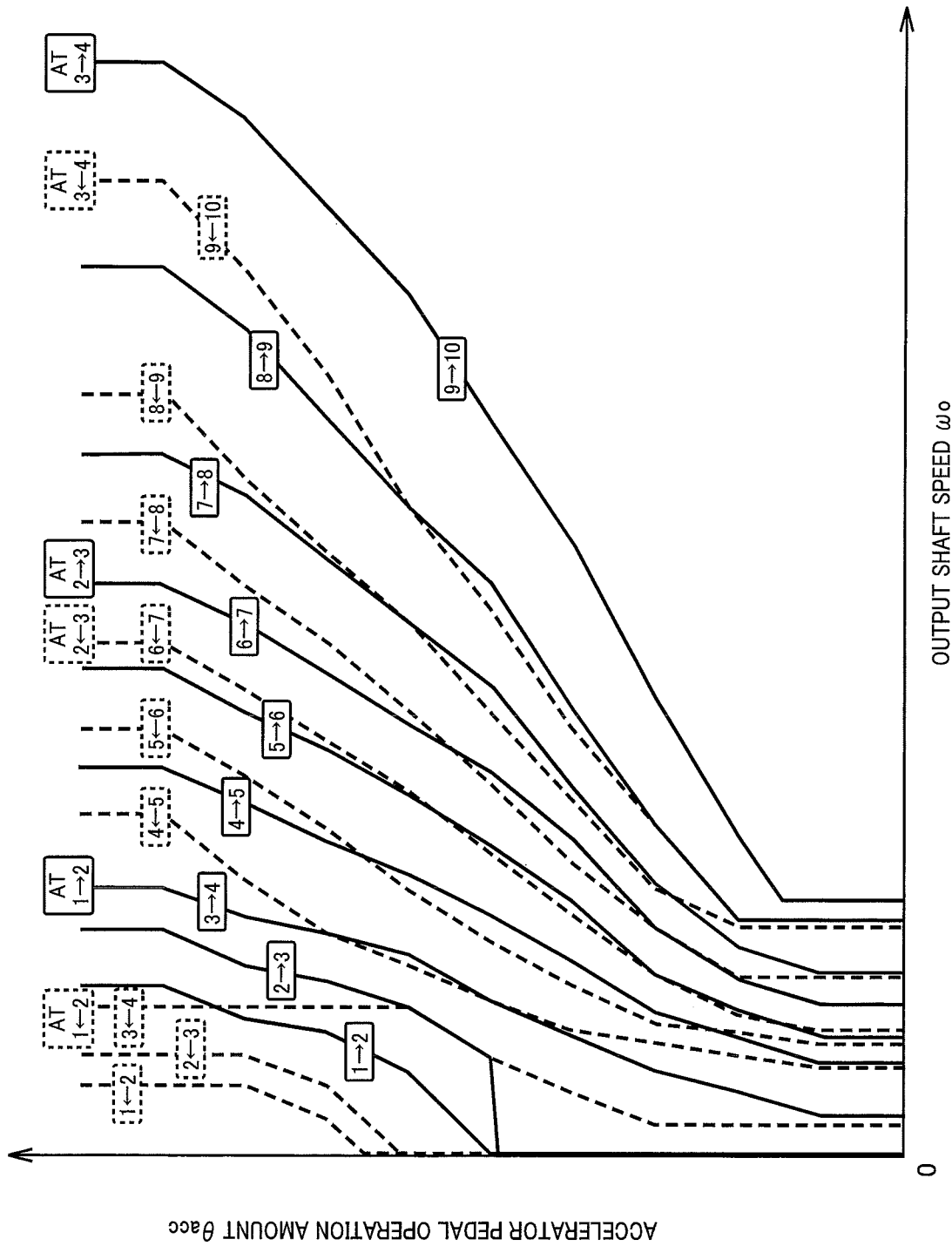
FIG. 6 is a view illustrating an example of an overall speed position shifting map used to shift the transmission device to a selected one of the plurality of overall speed positions.

The above-indicated overall speed position shifting map is a relationship between the output shaft speed ωo and the accelerator pedal operation amount θacc as parameters. FIG. 6 is the view illustrating an example of the overall speed position shifting map. In FIG. 6, solid lines indicate shift-up boundary lines while broken lines indicate shift-down boundary lines. The transmission device 40 consisting of the continuously variable transmission 18 and the step-variable transmission 20 which are disposed in series with each other is shifted from one of the overall speed positions to another according to the overall speed position shifting map, as if the transmission device 40 was shifted like a step-variable transmission as a whole. This overall step-variable shifting control to control the shifting actions of the transmission device 40 as the step-variable transmission as a whole may be implemented preferentially to the continuously variable shifting control of the transmission device 40 as the continuously variable transmission as a whole, only when a sporty drive mode or any other high-drivability drive mode is selected by the vehicle operator, or only when the required drive torque Tdem is comparatively large, but may be principally implemented except where the overall step-variable shifting control is restricted or inhibited.

The overall step-variable shifting control by the hybrid control portion 84 and the shifting control of the step-variable transmission 20 by the transmission shifting control portion 82 are implemented in cooperation with each other. In this embodiment, the first through tenth overall speed positions are established for the first through fourth speed AT gear positions. When the transmission device 40 is shifted between the fourth overall speed position and the third overall speed position, for example, the step-variable transmission 20 is shifted between the second speed AT gear position and the first speed AT gear position. When the transmission device 40 is shifted between the seventh overall speed position and the sixth overall speed position, the step-variable transmission 20 is shifted between the third speed AT gear position and the second speed AT gear position. When the transmission device 40 is shifted between the tenth overall speed position and the ninth overall speed position, the step-variable transmission 20 is shifted between the fourth speed AT gear position and the third speed AT gear position. In this respect, reference is made to FIG. 4.

Therefore, the AT gear position shifting map of FIG. 6 is formulated so that the AT gear position shifting operation is performed in synchronization with the overall speed position shifting operation. Described more specifically by reference to FIG. 6, the shift-up boundary lines for respectively shifting the transmission device 40 from the third overall speed position to the fourth overall speed position, from the sixth overall speed position to the seventh overall speed position, and from the ninth overall speed position to the tenth overall speed position coincide with the shift-up boundary lines for respectively shifting the step-variable transmission 20 from the first speed AT gear position to the second speed AT gear position (indicated as "AT1→2" in FIG. 6), from the second speed AT gear position to the third speed AT gear position, and from the third speed AT gear position to the fourth speed AT gear position. Similarly, the shift-down boundary lines for respectively shifting the transmission device 40 from the fourth overall speed position to the third overall speed position, from the seventh overall speed position to the sixth overall speed position, and from the tenth overall speed position to the ninth overall speed position coincide with shift-down boundary lines for respectively shifting the step-variable transmission 20 from the second speed AT gear position to the first speed AT gear position (indicated as "AT1←2" in FIG. 6), from the third speed AT gear position to the second speed AT gear position, and from the fourth speed AT gear position to the third speed AT gear position.

Alternatively, a command to shift the step-variable transmission 20 may be applied to the transmission shifting control portion 82 in response to a determination according to the overall speed position shifting map of FIG. 6 that the transmission device 40 should be shifted from one overall speed position to another. Thus, a shift-up action of the transmission device 40 as a whole takes place upon a shift-up action of the step-variable transmission 20, and a shift-down action of the transmission device 40 as a whole takes place upon a shift-down action of the step-variable transmission 20. The transmission shifting control portion 82 commands the step-variable transmission 20 to perform a shifting action from one AT gear position to another, for shifting the transmission device 40 from one overall speed position to another. Since the AT gear position shifting operation is performed in synchronization with the overall speed position shifting operation, the shifting action of the step-variable transmission 20 is performed with a change of the engine speed ωe, so that the vehicle operator is less likely to uncomfortably recognize a shifting shock of the step-variable transmission 20.

The hybrid control portion 84 selectively establishes the motor drive mode or the hybrid drive mode, depending upon a running state of the vehicle 10. For example, the hybrid control portion 84 selects the motor drive mode when the required vehicle drive power Pdem is lower than a predetermined threshold value, that is, within a predetermined motor drive mode range, and selects the hybrid drive mode when the required vehicle drive power Pdem is equal to or higher than the threshold value, that is, within a predetermined hybrid drive mode range. Further, even when the required vehicle drive power Pdem is within the motor drive mode range, the hybrid control portion 84 selects the hybrid drive mode if the electric power amount SOC stored in the battery 52 is smaller than a predetermined threshold value.

The transmission shifting control portion 82 implements a shift-down action of the step-variable transmission 20, when a determination to implement the shift-down action is made upon determination that a point indicative of a running state of the vehicle 10 has moved across any one of the shift-down boundary lines in the AT gear position shifting map, as a result of a depressing operation of the accelerator pedal. A power-on shift-down action of the step-variable transmission 20 to be implemented as a result of the depressing operation of the accelerator pedal causing an increase of the engine power Pe is controlled primarily by regulating a releasing hydraulic pressure Poff of the releasing-side coupling device CB to be brought into its released state to implement the power-on shift-down action.

By the way, a control to lower a rate of rise of the power Pe (output) of the engine 14 is implemented in order to reduce a risk of generation of a tip-in shock, a shock when an acceleration pedal is quickly depressed, due to butting of gear teeth of the vehicular drive system 12 when the vehicle 10 is switched from a non-driven state to a driven state as a result of a rapid depressing operation of the accelerator pedal after its releasing action to its non-operated position. Accordingly, the rate of rise of the engine power Pe may be lowered in the process of the power-on shift-down action of the step-variable transmission 20. In this case, the rate of rise of the engine power Pe after a moment of initiation of an inertia phase of the power-on shift-down action of the step-variable transmission 20 is increased, and a rate of rise of the input shaft speed $\omega i$ is increased. To restrict the rate of rise of the input shaft speed $\omega i$, a regenerative control of the second motor/generator MG2 is implemented, so that a charging load is applied to the battery 52. Where the maximum charging amount Win of electric power of the battery 52 is relatively small, the maximum amount of electric power regenerated by the second motor/generator MG2 is limited, so that it is difficult to restrict the rate of rise of the input shaft speed $\omega i$, giving rise to a risk of racing of the input shaft speed $\omega i$, and a consequent increase of an engaging shock of the engaging-side coupling device CB to be brought into its engaged state in the process of the power-on shift-down action, namely, a shifting shock of the step-variable transmission 20.

To solve the problem described above, the electronic control device 80 includes shifting delay determining means in the form of a shifting delay determining portion 86, and engine stability time estimating means in the form of an engine stability time estimating portion 88. It is noted that the transmission shifting control portion 82 and the shifting delay determining portion 86 correspond to a control portion of the control apparatus according to the present invention.

When a determination to implement the power-on shift-down action (hereinafter referred to simply as "shift-down action") of the step-variable transmission 20 is made, the shifting delay determining portion 86 determines whether generation of a shift-down command to implement the shift-down action should be delayed with respect to the moment of the determination to implement the shift-down action. This determination as to whether the generation of the shift-down command should be delayed is made depending upon whether a length of stability time Tstb described below is equal to or shorter than a predetermined value Tf. The moment of generation of the shift-down command to implement the shift-down action corresponds to a moment of generation of the relevant hydraulic control command signal Sat to be applied to the hydraulic control unit 54 for controlling the step-variable transmission 20. Therefore, the moment of generation of the shift-down command to implement the shift-down action corresponds to the moment of initiation of the shift-down action.

Upon determination to implement the shift-down action, the engine stability time estimating portion 88 estimates the length of stability time Tstb used to determine whether the moment of generation of the shift-down command should be delayed or not. The length of stability time Tstb is a length of time from the moment of the determination to implement the shift-down action, which is required for stabilization of the engine power (output) Pe. A state of stabilization of the engine power Pe is a state in which the rate of rise of the engine power Pe (an amount of increase of the engine power Pe per unit time) is supposed to have been lowered to or below a predetermined value as a result of increase of the actual value of the engine power Pe toward the required (commanded target) engine power Pedem. The above-indicated predetermined value of the rate of rise of the engine power Pe is set to be a value at or below which a rate of rise of the input shaft speed $\omega i$ after initiation of the inertia phase of the power-on shift-down action of the step-variable transmission 20 falls within a permissible range (in which a risk of racing of the input shaft speed $\omega i$ is sufficiently low, for example).

The engine stability time estimating portion 88 is configured to estimate the length of stability time Tstb according to a predetermined estimating map which is obtained by experimentation or theoretical analysis and stored in a memory. For example, the predetermined estimating map is a relationship between the length of stability time Tstb, and a selected one of various parameters relating to the length of stability time Tstb, such as: engine power Pe or a value (e.g., intake air quantity Qair) relating to the engine power Pe, at the moment of the determination to implement the shift-down action; required engine power Pedem or a value (e.g., accelerator pedal operation amount $\theta acc$) relating to the required engine power Pedem; and a value (engine speed $\omega e$, cooling water temperature Tw, limitation of the rate of change of the engine power Pe by the hybrid controls, etc.) relating to the response of the engine power Pe. Thus, the length of stability time Tstb required for stabilization of the engine power Pe can be estimated on the basis of the selected parameter and according to the estimating map. For example, the limitation of the rate of change of the engine power Pe by the hybrid controls is a limitation of the rate of rise of the engine power Pe to reduce the risk of generation of the above-indicated tip-in shock due to butting of gear teeth of the vehicular drive system 12 upon switching of the engine power Pe from a negative value to a positive value.

When the engine power Pe or the value relating to the engine power Pe is relatively large, for instance, a difference (Pedem−Pe) of the engine power Pe with respect to the required engine power Pedem is smaller than when the engine power Pe or the value relating to the engine power Pe is relatively small. Accordingly, the estimating map is formulated such that the length of stability time Tstb is shorter when the engine power Pe or the value relating to the engine power Pe is relatively large than when it is relatively small. When the required engine power Pedem or the value relating to the required engine power Pedem is relatively large, on the other hand, a difference (Pedem−Pe) between the required engine power Pedem and the engine power Pe is larger than when the required engine power Pedem or the value relating to the required engine power Pedem is relatively small. Accordingly, the estimating map is formulated such that the length of stability time Tstb is longer when the required engine power Pedem or the value relating to the required engine power Pedem is relatively large than when it is relatively small. The engine stability time estimating portion 88 estimates the length of stability time Tstb on the basis of the selected parameter and according to the estimating map as described above by way of example.

The shifting delay determining portion 86 is configured to determine whether the estimated length of stability time Tstb is equal to or shorter than the predetermined value Tf. This predetermined value Tf is set to a length of time from the moment of generation of the shift-down command to implement the shift-down action of the step-variable transmission 20 to the moment of initiation of the inertia phase of the power-on shift-down action of the step-variable transmission 20. The shifting delay determining portion 86 stores a predetermined value determining map used to determine the predetermined value Tf in advance.

The predetermined value determining map, which is obtained by experimentation or theoretical analysis, is a relationship between the predetermined value Tf, and a selected one of various parameters relating to the predetermined value Tf (namely, relating to the moment of initiation of the inertia phase). For instance, those parameters include: temperature THoil of the working fluid; input torque Ti of the step-variable transmission 20 or a value (e.g., accelerator pedal operation amount θacc) relating to the input torque Ti; and vehicle running speed V. The predetermined value determining map is formulated such that the time length before the moment of initiation of the inertia phase of the power-on shift-down action of the step-variable transmission 20 can be obtained.

For instance, the moment of initiation of the inertia phase tends to be delayed as the temperature THoil of the working fluid is lowered, since the viscosity of the working fluid increases as the temperature THoil is lowered. Accordingly, the predetermined value determining map is formulated such that the predetermined value Tf increases as the working fluid temperature THoil is lowered. Further, the moment of initiation of the inertia phase tends to be advanced as the input torque Ti of the step-variable transmission 20 or the value relating to the input torque Ti is increased. Accordingly, the predetermined value determining map is formulated such that the predetermined value Tf decreases as the input torque Ti or the value relating to the input torque Ti is increased. The shifting delay determining portion 86 sets the predetermined value Tf, which is a required time from the moment of outputting shifting command until the moment of initiation of the inertia phase, on the basis of the selected one of the parameters and according to the predetermined value determining map.

The shifting delay determining portion 86 is further configured to determine whether the estimated length of stability time Tstb is equal to or shorter than the predetermined value Tf. When the estimated length of stability time Tstb is equal to or shorter than the predetermined value Tf (that is, when Tstb≤Tf), the shifting delay determining portion 86 determines that the moment of generation of the shift-down command should not be delayed, and commands the transmission shifting control portion 82 to generate the shift-down command at the moment of determination to implement the shift-down action. Accordingly, the transmission shifting control portion 82 generates the hydraulic control command signals Sat (shifting command) to be applied to the hydraulic control unit 54, at the moment of determination to implement the shift-down action, so that the shift-down action is initiated at the moment of determination to implement the shift-down action. Where the estimated length of stability time Tstb is equal to or shorter than the predetermined value Tf, the engine power Pe is stabilized prior to the moment of initiation of the inertia phase of the power-on shift-down action of the step-variable transmission 20, without delaying the moment of generation of the shift-down command, so that the engine power Pe is stabilized after the moment of initiation of the inertia phase, and the rate of rise of the input shaft speed ωi falls within the permissible range. Therefore, the risk of racing of the input shaft speed ωi is reduced, and the risk of generation of the engaging shock of the engaging-side coupling device CB is reduced. Further, the shift-down action of the step-variable transmission 20 is immediately initiated without delaying the moment of generation of the shift-down command, so that the risk of deterioration of the control response of the shift-down action is reduced.

When the estimated length of stability time Tstb is longer than the predetermined value Tf (that is, when Tstb>Tf), on the other hand, the engine power Pe is not stabilized even after the moment of initiation of the inertia phase, unless the moment of generation of the shift-down command is delayed. Accordingly, the rate of rise of the input shaft speed (i after the moment of initiation of the inertia phase is relatively high, giving rise to a high risk of generation of a considerable engaging shock of the engaging-side coupling device CB due to racing of the input shaft speed mi. In view of this, the shifting delay determining portion 86 determines that the moment of generation of the shift-down command to implement the shift-down action should be delayed with respect to the moment of determination to implement the shift-down action, when the estimated length of stability time Tstb is longer than the predetermined value Tf. Further, the shifting delay determining portion 86 commands the transmission shifting control portion 82 to delay the moment of generation of the shift-down command to implement the shift-down action, by a delay time Tdelay which is set to be longer than a difference (=Tstb−TI) between the estimated length of stability time Tstb and the predetermined value TE The delay time Tdelay is calculated by adding an extra time to the difference (=Tstb−T) between the estimated length of stability time Tstb and the predetermined value Tf. The extra time is determined by taking account of individual variations of the vehicle 10, for example.

Accordingly, the transmission shifting control portion 82 delays the moment of generation of the shift-down command to implement the shift-down action of the step-variable transmission 20, by the delay time Tdelay from the moment of determination of the shift-down action. Described more specifically, the transmission shifting control portion 82 delays a moment of generation of the hydraulic control commands to the hydraulic control unit 54 to implement the shift-down action, by the calculated delay time Tdelay with respect to the moment of determination to implement the shift-down action, so that the shift-down action of the step-variable transmission 20 is initiated with the delay time Tdelay after the moment of determination to implement to the shift-down action. Thus, the moment of generation of the shift-down command is delayed by the delay time Tdelay, so that the inertia phase of the power-on shift-down action of the step-variable transmission 20 is initiated after the engine power Pe has been stabilized. As a result, the rate of rise of the input shaft speed ωi during the inertia phase is restricted, and the risk of racing of the input shaft speed ωi is accordingly reduced, whereby the risk of generation of the engaging shock of the engaging-side coupling device CB is reduced.

Since the delay time Tdelay is calculated on the basis of the difference (=Tstb−Tf) between the estimated length of stability time Tstb and the predetermined value Tf, the calculated delay time Tdelay from the moment of determination to implement the shift-down action to the moment of generation of the shift-down command increases with an increase of the estimated length of stability time Tstb. The length of time until the engine power Pe has been stabilized increases with the increase of the estimated length of stability time Tstb, so that the delay time Tdelay increases with the increase of the estimated length of stability time Tstb, whereby the engine power Pe can be stabilized before the moment of initiation of the inertia phase. Where the predetermined value Tf of the estimated length of stability time Tstb from the moment of initiation of the shift-down action to the moment of initiation of its inertia phase is relatively long, the delay time Tdelay is set to be shorter than where the predetermined value Tf is relatively short. Where the predetermined value Tf is relatively long, the length of time from the moment of initiation of the shift-down action to the moment of initiation of the inertia phase is relatively long, so that the engine power Pe has been stabilized before the moment of initiation of the inertia phase, whereby the shift-down action can be implemented after the engine power Pe has been stabilized, even when the delay time Tdelay is relatively short.

If the delay time Tdelay is excessively long, that is, if the moment of generation of the shift-down command is excessively delayed, there is a risk of reduction of the control response of the shift-down action (a risk of deterioration of drivability of the vehicle 10). In view of this, the delay time Tdelay to be set by the shifting delay determining portion 86 has a predetermined upper limit (permissible maximum value) Tlim. Where the calculated delay time Tdelay exceeds the upper limit Tlim, the shifting delay determining portion 86 sets the delay time Tdelay at the upper limit Tlim. This upper limit Tlim is changed according to various parameters such as the vehicle running speed V, shift position POSsh, presently selected drive mode of the vehicle 10, and accelerator pedal operation amount θacc, for instance.

Where a sporty drive mode is selected as the drive mode of the vehicle 10, for example, a higher degree of control response of the shift-down action is required than where a normal drive mode is selected. Therefore, the upper limit Tlim is set to be shorter where the sporty drive mode is selected than where the normal drive mode is selected. Where the accelerator pedal operation amount θacc is relatively large, it is considered that the vehicle operator desires rapid acceleration of the vehicle 10, so that a higher degree of control response of the shift-down action is required than where the accelerator pedal operation amount θacc is relatively small. Therefore, the upper limit Tlim is set to be shorter where the accelerator pedal operation amount θacc is relatively large, than where the accelerator pedal operation amount θacc is relatively small. The shifting delay determining portion 86 sets an adequate value of the upper limit Tlim according to the various parameters indicated above.

Figure 7:
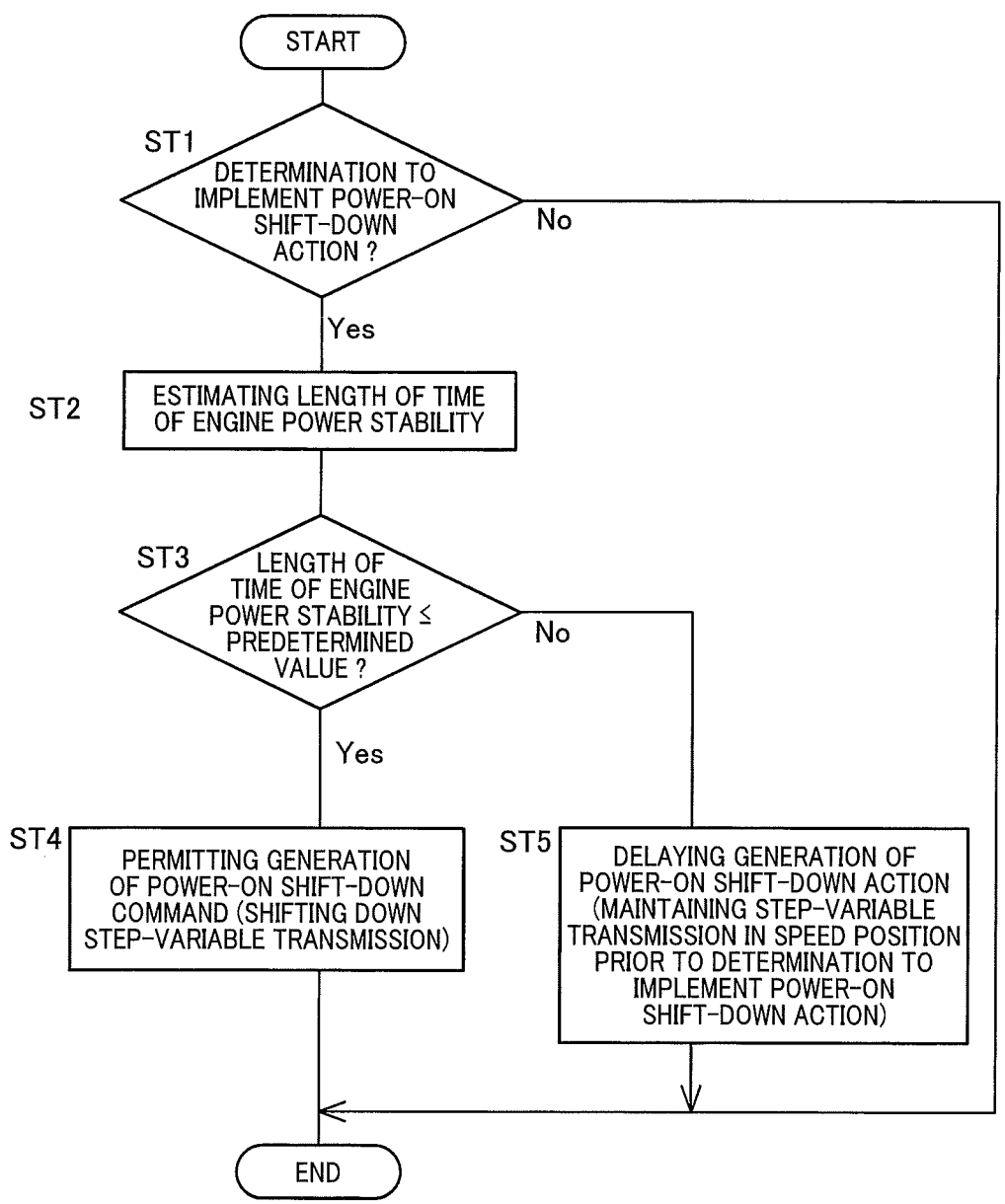
FIG. 7 is a flow chart illustrating an essential part of a control routine executed by the control apparatus in the form of an electronic control device shown in FIG. 1, namely, a control operation implemented so as to reduce a risk of generation of an engaging shock of a coupling device of the step-variable transmission in the process of a power-on shift-down action of the step-variable transmission.

FIG. 7 is the flow chart illustrating an essential part of a control routine executed by the electronic control device 80, namely, a control operation implemented so as to reduce the risk of generation of the engaging shock of the engaging-side coupling device CB of the step-variable transmission 20 in the process of its power-on shift-down action. This control routine is repeatedly executed during running of the vehicle 10.

The control routine of FIG. 7 is initiated with a step ST1 corresponding to a function of the transmission shifting control portion 82, to determine whether a determination to implement the power-on shift-down action of the step-variable transmission 20 has been made or not. If a negative determination is obtained in the step ST1, one cycle of execution of the control routine is terminated. If the determination to implement the power-on shift-down action is made, an affirmative determination is obtained in the step ST1, and the control flow goes to a step ST2 corresponding to a function of the engine stability time estimating portion 88, to estimate the length of stability time Tstb required for stabilization of the engine power Pe, on the basis of the engine power Pe, the required engine power Pedem, etc.

The step ST2 is followed by a step ST3 corresponding to a function of the shifting delay determining portion 86, to determine whether the estimated length of stability time Tstb is equal to or shorter than the predetermined value Tf. If the estimated length of stability time Tstb is equal to or shorter than the predetermined value Tf, an affirmative determination is obtained in the step ST3, and the control flow goes to a step ST4 corresponding to a function of the transmission shifting control portion 82, to generate the hydraulic control command signals Sat (shift-down command) to be applied to the hydraulic control unit 54, for implementing the shift-down action of the step-variable transmission 20, so that the shift-down action is initiated at the moment of determination to implement the shift-down action. If the estimated length of stability time Tstb is longer than the predetermined value Tf a negative determination is obtained in the step ST3, and the control flow goes to a step ST5.

In the step ST5 corresponding to functions of the transmission shifting control portion 82 and the shifting delay determining portion 86, the delay time Tdelay is calculated, and the hydraulic control command signals Sat (shift-down command) are generated and applied to the hydraulic control unit 54 when the calculated delay time Tdelay has passed after the moment of determination to implement the shift-down action. Accordingly, the inertia phase of the power-on shift-down action of the step-variable transmission 20 is initiated after the engine power Pe has been stabilized, so that the rate of rise of the input shaft speed ωi during the inertia phase is restricted, and the risk of generation of the engaging shock of the engaging-side coupling device CB in the process of the shift-down action is reduced.

Figure 8:
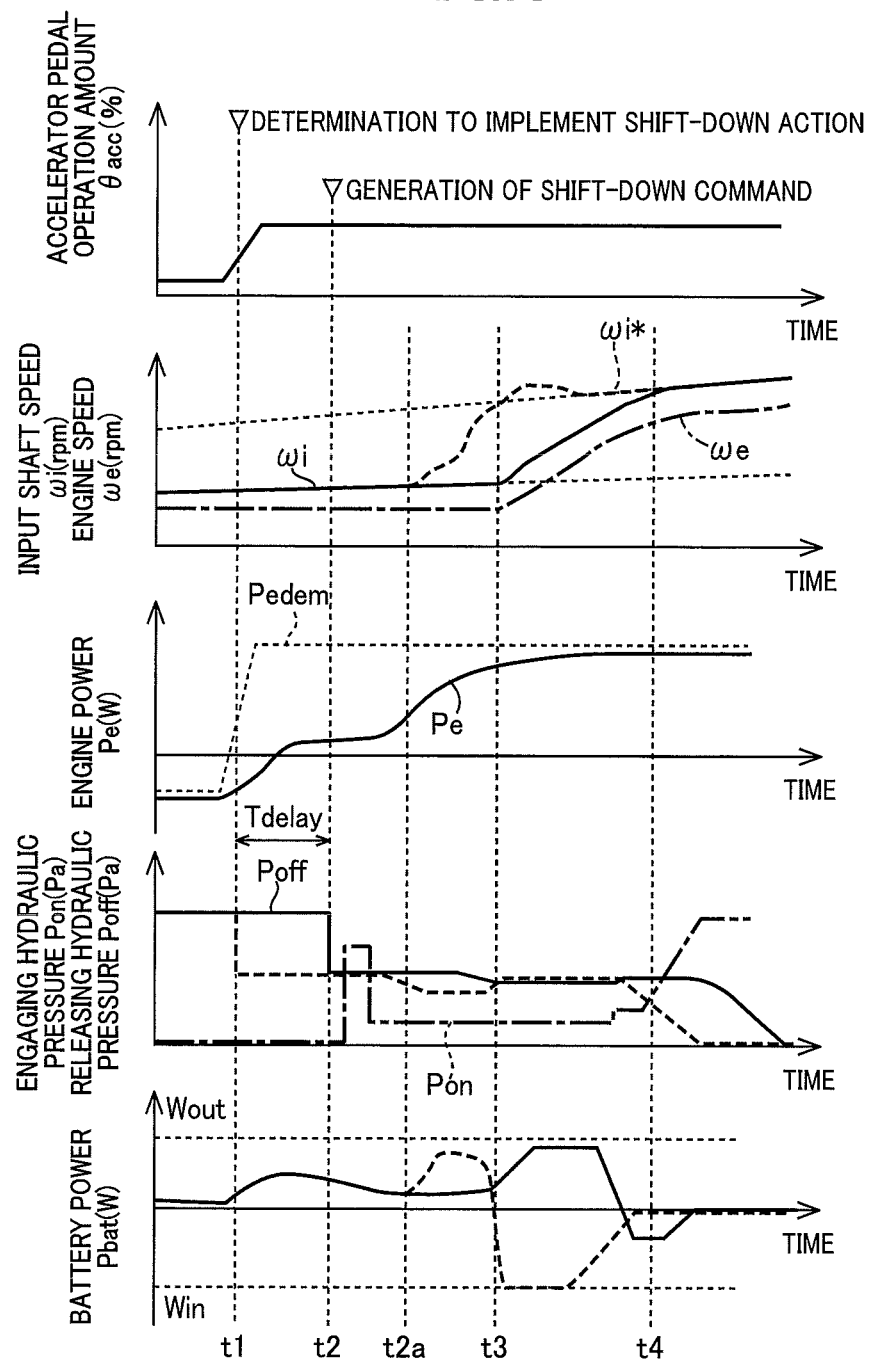
FIG. 8 is a time chart showing an example of changes of various parameters when the control operation illustrated in the flow chart of FIG. 7 is performed.

FIG. 8 is the time chart showing an example of changes of various parameters when the control operation illustrated in the flow chart of FIG. 7 is performed. In the example of the time chart of FIG. 8, the length of stability time Tstb estimated upon determination to implement the power-on shift-down action of the step-variable transmission 20 is longer than the predetermined value Tf. In the time chart of FIG. 8, the time is taken along a horizontal axis, while the accelerator pedal operation amount θacc, the input shaft speed ωi, the engine speed ωe, the engine power Pe, a commanded engaging hydraulic pressure Pon of the engaging-side coupling device CB, a commanded releasing hydraulic pressure Poff of the releasing-side coupling device CB, and the electric power Pbat of the battery 52 are taken along a vertical axis. Further, "t1" represents a point of time at which the determination to implement the shift-down action of the step-variable transmission 20 is made, while "t2" represents a point of time at which the shift-down command (in the form of the hydraulic control command signals Sat) is generated.

As shown in FIG. 8, the accelerator pedal operation amount θacc is increased as a result of a depressing operation of the accelerator pedal prior to the point of time t1, so that the engine power Pe is accordingly increased. At the point of time t1, the determination to implement the shift-down action of the step-variable transmission 20 is made as a result of an increase of the accelerator pedal operation amount θacc. When the determination to implement the shift-down action is made at the point of time t1, the determination as to whether the estimated length of stability time Tstb is equal to or shorter than the predetermined value Tf is made. Since the estimated length of stability time Tstb is longer than the predetermined value Tf, a determination to delay the moment of generation of the shift-down command is made, and the delay time Tdelay is calculated. The shift-down command is generated at the point of time t2 which is after the point of time t1 by the calculated delay time Tdelay.

At the point of time t2, the releasing hydraulic pressure Poff of the releasing-side coupling device CB to be brought into its released state in the process of the shift-down action (for example, the clutch C2 to be brought into its released state for shifting down the step-variable transmission 20 from the third speed AT gear position to the second speed AT gear position) is lowered to a predetermined value and held at this value, as indicated by a solid line. On the other hand, the engaging hydraulic pressure Pon of the engaging-side coupling device CB to be brought into its engaged state in the process of the shift-down action (the brake B1 in the case of the shift-down action from the third speed AT gear position to the second speed AT gear position) is temporarily raised (to quickly fill an oil chamber in the relevant coupling device CB) at a point of time a predetermined length of time after the point of time t2, then lowered to a predetermined value and held at this value, as indicated by a one-dot chain line.

The engine power Pe is changed from a negative value to a positive value (to switch the vehicle 10 from the non-driven state to the driven state), during a period of time between the points of time t1 and t2. To reduce the risk of generation of the tip-in shock described above, the rate of rise of the engine power Pe is lowered while the engine power Pe is changed from the negative value to the positive value.

At a point of time t3, the inertia phase of the power-on shift-down action of the step-variable transmission 20 is initiated. Since the moment of generation of the shift-down command is delayed by the delay time Tdelay, the engine power Pe is raised to a value close to the required engine power Pedem, while the rate of rise of the engine power Pe is held within a permissible range (held in a stabilized state). Accordingly, the rate of rise of the input shaft speed ωi during the inertia phase is held within the permissible range, and the risk of racing of the input shaft speed ωi near a point of time t4 is reduced. At the point of time t4 at which the input shaft speed ωi has reached a target value ωi* (synchronizing speed) after completion of the shift-down action, the engaging hydraulic pressure Pon is raised while the rate of rise of the input shaft speed ωi is held within the permissible range, so that the risk of racing of the input shaft speed ωi at the point of time t4 is reduced, and the risk of generation of the engaging shock of the engaging-side coupling device CB is also reduced.

Broken lines in FIG. 8 indicate changes of the various parameters where the moment of generation of the shift-down command is not delayed. In this case, the releasing hydraulic pressure Poff is lowered at the point of time t1, and the inertia phase is initiated at a point of time t2a, as indicated by the broken lines. At this point of time t2a, the engine power Pe has not been stabilized, and the rate of rise of the engine power Pe after the point of time t2a is relatively high, so that the rate of rise of the input shaft speed ωi is also relatively high, whereby the racing of the input shaft speed ωi takes place at the point of time t3. To reduce the rate of rise of the input shaft speed ωi to reduce the risk of its racing, the regenerative control of the second motor/generator MG2 is implemented. However, when the battery power Pbat is limited by the maximum charging amount Win, the rate of rise of the input shaft speed ωi cannot be sufficiently reduced, so that the racing of the input shaft speed ωi takes place as described with the broken line, and the engaging-side coupling device CB has a relatively large amount of engaging shock. To the contrary, the present embodiment is configured to delay the moment of generation of the shift-down command, for thereby reducing the risk of generation of the engaging shock of the engaging-side coupling device CB, without implementing the regenerative control of the second motor/generator MG2. Namely, the present embodiment permits reduction of the risk of generation of the engaging shock, even where the maximum charging amount Win is relatively small while the temperature of the battery 52 is relatively low or high, or where the stored electric power amount SOC is relatively large (i.e., the regenerative amount by the second motor/generator MG2 is limited).

The present embodiment described above is configured to delay the moment of generation of the shift-down command to implement the shift-down action of the step-variable transmission 20, where the estimated length of stability time Tstb required for stabilization of the power Pe of the engine 14 is longer than the predetermined value Tf. Namely, where the length of time required for stabilization of the engine power Pe is relatively long, the moment of initiation of the shift-down action of the step-variable transmission 20 is delayed, so that the shift-down action can be implemented while the engine power Pe is held in a more stable state, than where the moment of generation of the shift-down command is not delayed. Accordingly, the risk of generation of the engaging shock of the engaging-side coupling device CB can be more effectively reduced. Where the length of stability time Tstb is not longer than the predetermined value Tf, the engine power Pe can be stabilized in a shorter length of time. In this case, the moment of initiation of the shift-down action is not delayed, so that the shift-down action can be implemented with a higher degree of control response.

The present embodiment is further configured such that the delay time Tdelay from the moment of determination to implement the shift-down action of the step-variable transmission 20 to the moment of generation of the shift-down command is increased with an increase of the estimated length of stability time Tstb. Accordingly, the moment of generation of the shift-down command is delayed by a length of time which is increased with the increase of the estimated length of stability time Tstb required for stabilization of the power Pe of the engine 14, so that the shift-down action can be implemented while the engine power Pe is stabilized, with the delay time Tdelay being set at an adequate value corresponding to the estimated length of stability time Tstb, and the risk of generation of the engaging shock of the engaging-side coupling device CB can be reduced. The present embodiment is further configured such that the predetermined upper limit Tlim is set as the delay time Tdelay where the calculated delay time Tdelay is longer than the upper limit Tlim. Accordingly, it is possible to reduce the deterioration of the control response of the shift-down action due to an excessively long length of delay of the moment of generation of the shift-down command. The present embodiment is also configured such that the predetermined value Tf of the length of stability time Tstb is set to be a length of time from the moment of generation of the shift-down command to the moment of initiation of the inertia phase of the power-on shift-down action of the step-variable transmission 20. Therefore, the moment of generation of the shift-down command is delayed where the power Pe of the engine 14 has not been stabilized before the moment of initiation of the inertia phase, so that it is possible to reduce the risk of generation of the engaging shock of the engaging-side coupling device CB due to an increase of the engine power Pe during the inertia phase. The present embodiment is further configured such that the delay time Tdelay is set to be equal to or longer than a difference between the estimated length of stability time Tstb and the predetermined value Tf, so that the delay time Tdelay which increases with an increase of the estimated length of stability time Tstb is set at an adequate value corresponding to the estimated length of stability time Tstb.

A second embodiment of this invention will be described. It is noted that the same reference signs as used in the first embodiment will be used to identify the elements of the second embodiment corresponding to those of the first embodiment, and that those elements will not be redundantly described.

Second Embodiment

Figure 9:
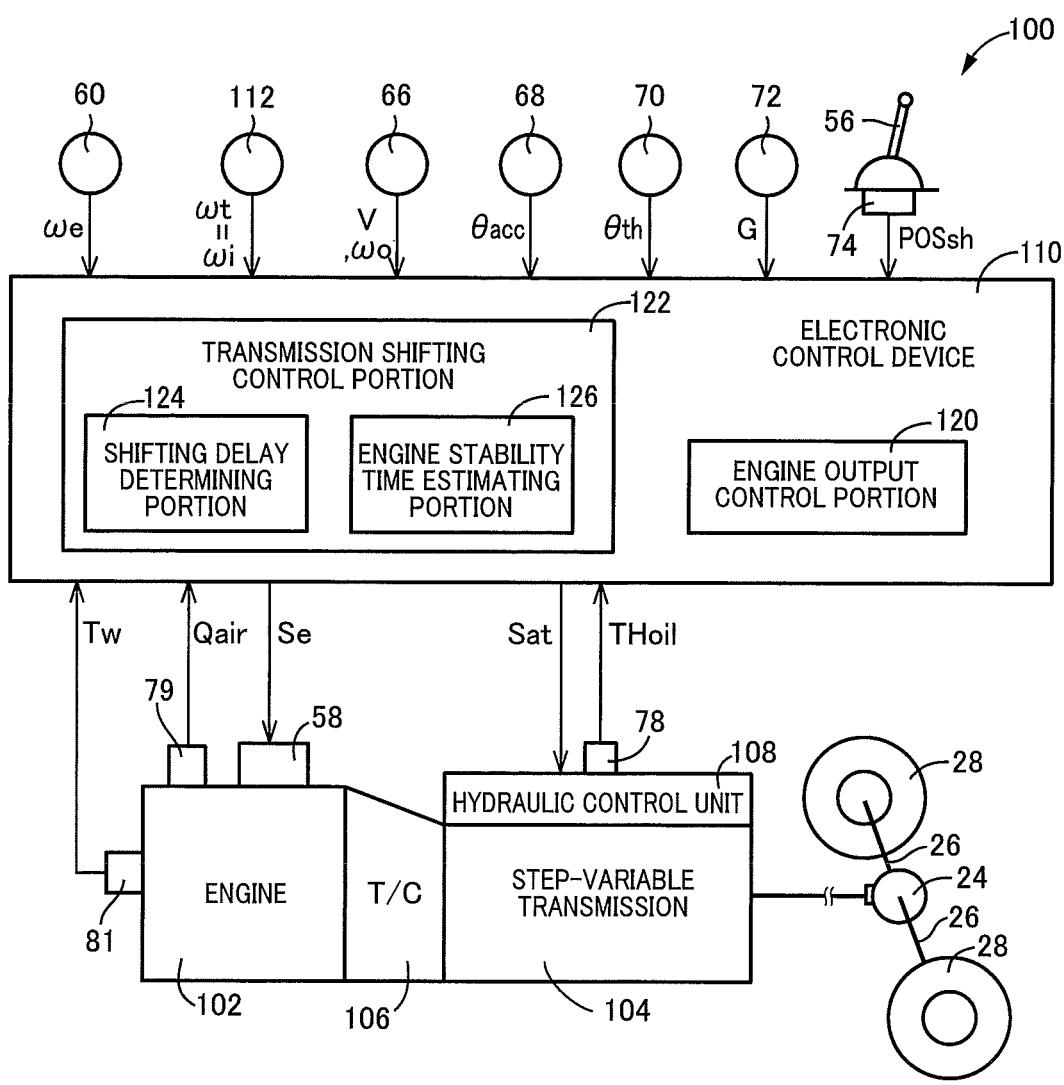
FIG. 9 is a schematic view showing an arrangement of another example of the vehicular drive system to be controlled by an electronic control device according to another embodiment of the present invention, and major control functions and control portions of the electronic control device.

FIG. 9 is the schematic view showing an arrangement of a vehicle 100 to be controlled by a control apparatus according to another embodiment of the present invention, and major control functions and control portions of the control apparatus. This vehicle 100 is provided with an engine 102 functioning as a drive power source, a step-variable transmission 104 having a plurality of coupling devices CB, and a torque converter 106 disposed between the engine 102 and the step-variable transmission 104. The vehicle 100 in this second embodiment is different from the vehicle 10 in the first embodiment in that the vehicle 100 uses only the engine 102 as the drive power source, and is provided with the torque converter 106 between the engine 102 and the step-variable transmission 104. The engine 102 is principally the same as the engine 14 in the first embodiment, and will not be described redundantly. Like the step-variable transmission 20, the step-variable transmission 104 is provided with a plurality of planetary gear sets, and the plurality of coupling devices CB, and is shifted to a selected one of AT gear positions with engaging actions of respective combinations of the coupling devices CB.

The torque converter 106 is a well known fluid-operated power transmitting device which is constructed to implement power transmission through a working fluid, and which is provided with a pump impeller and a turbine impeller, which are not shown in FIG. 9. The pump impeller is an input rotary member operatively connected to the engine 102 in a power transmittable manner, while the turbine impeller is an output rotary member. In the vehicle 100, a torque Te of the engine 102 is received by the step-variable transmission 104 through the torque converter 106, and is transmitted to the drive wheels 28, with the engine torque Te being changed according to the presently selected one of the AT gear positions of the step-variable transmission 104.

The vehicle 100 is provided with the control apparatus in the form of an electronic control device 110 for controlling the engine 102, the step-variable transmission 104. The electronic control device 110 receives an output signal of a turbine speed sensor 112 indicative of a rotating speed $\omega t$ of the turbine impeller of the torque converter 106, in place of the output signal of the MG1 speed sensor 62 indicative of the MG1 speed $\omega g$ and the output signal of the MG2 speed sensor 64 indicative of the MG2 speed $\omega m$. The turbine speed $\omega t$ corresponds to an input shaft speed $\omega i$ of the step-variable transmission 104. It is noted that the electronic control device 110 receives output signals of various other sensors, which are the same as those provided in the first embodiment and which will not be described redundantly.

The electronic control device 110 generates various output signals to the various devices provided on the vehicle 100, such as: the engine control command signal Se to be applied to the engine control device 58 provided to control the throttle actuator, the fuel injecting device and the ignition device, for controlling the engine 102; and the hydraulic control command signals Sat to be applied to a hydraulic control unit 108 provided to control the operating states of the coupling devices CB. The hydraulic control command signals Sat are command signals (drive currents) to be applied to the hydraulic control unit 108, for driving various solenoid-operated valves which regulate the engaging hydraulic pressure PRcb to be applied to each of the hydraulic actuators of the coupling devices CB.

The electronic control device 110 includes an engine output control portion 120 functioning as engine output control means, and a transmission shifting control portion 122 functioning as transmission shifting control means, for implementing various controls of the vehicle 100.

The engine output control portion 120 is configured to apply to the engine control device 58 the engine control command signal Se such as a throttle valve control signal, an injection control signal and an ignition timing control signal, for controlling an output of the engine 102. The engine output control portion 120 sets a required engine torque Tedem for obtaining a required drive torque Tdem calculated on the basis of the accelerator pedal operation amount $\theta acc$ and the vehicle running speed V, and controls the throttle actuator to open and close an electronic throttle valve, the fuel injecting device to control an amount of fuel injection into the engine 102, and the ignition device to control the ignition timing of the engine 102, so as to obtain the required engine torque Tedem.

The transmission shifting control portion 122 is configured to determine a shifting action of the step-variable transmission 104 according to a memory-stored AT gear position shifting map obtained by experimentation or determined by an appropriate design theory, and applies the shift-down command in the form of the hydraulic control command signals Sat to the hydraulic control unit 108, for commanding the solenoid-operated valves to bring the appropriate ones of the coupling devices CB into the released and engaged states, for automatically shifting up or down the step-variable transmission 104. The AT gear position shifting map is a predetermined relationship having shifting lines (shift-up boundary lines and shift-down boundary lines) used to determine whether the step-variable transmission 104 should be shifted up or down. These shifting lines are defined in a two-dimensional coordinate system in which an output shaft speed $\omega o$ of the step-variable transmission 104 (equivalent to the vehicle running speed V) and the accelerator pedal operation amount $\theta acc$ (equivalent to the required drive torque Tdem or throttle valve opening angle $\theta th$) are taken as two variables along respective two axes.

The transmission shifting control portion 122 determines a shift-down action of the step-variable transmission 104 when a point indicative of a running state of the vehicle 100 has moved across any one of shift-down boundary lines in the AT gear position shifting map as a result of a depressing operation of the accelerator pedal. According to this determination, the transmission shifting control portion 122 generates the hydraulic control command signals Sat to the hydraulic control unit 108. This shift-down action (power-on shift-down action) of the step-variable transmission 104 to be implemented as a result of the depressing operation of the accelerator pedal causing an increase of the engine torque Te is controlled primarily by regulating a releasing hydraulic pressure Poff of the releasing-side coupling device CB to be brought into its released state to implement the power-on shift-down action.

In the vehicle 100, the initiation of an inertia phase of the shift-down action of the step-variable transmission 104 while the engine torque Te is not stabilized may cause an increase of a rate of rise of the turbine speed $\omega t$ during the inertia phase, and generation of racing of the turbine speed $\omega t$, giving rise to a risk of generation of an engaging shock of the engaging-side coupling device CB. In view of this risk, the present embodiment is also configured to delay the moment of generation of the shift-down command (in the form of the hydraulic control command signals Sat) with respect to the moment of determination to implement the power-on shift-down action, for reducing the risk of generation of the engaging shock.

The electronic control device 110 includes shifting delay determining means in the form of a shifting delay determining portion 124, and engine stability time estimating means in the form of an engine stability time estimating portion 126. It is noted that the transmission shifting control portion 122 and the shifting delay determining portion 124 correspond to a control portion of the control apparatus according to the present invention.

When the determination to implement the power-on shift-down action (hereinafter referred to as "shift-down action") is made by the transmission shifting control portion 122, as a result of the depressing operation of the accelerator pedal, the shifting delay determining portion 124 determines whether the moment of generation of the hydraulic control command signal Sat (the shift-down command) to the hydraulic control unit 108 should be delayed with respect to the moment of determination to implement the shift-down action. This determination is made depending upon whether the length of stability time Tstb estimated by the engine stability time estimating portion 126 is equal to or shorter than the predetermined value Tf.

Upon determination to implement the shift-down action, the engine stability time estimating portion 126 estimates the length of stability time Tstb used to determine whether the moment of generation of the shift-down command should be delayed or not. The length of stability time Tstb is a length of time from the moment of the determination to implement the shift-down action, which is required for stabilization of the torque Te (output) of the engine 102 (engine torque Te). A state of stabilization of the engine torque Te is a state in which a rate of rise of the engine torque Te (an amount of increase of the engine torque Te per unit time) has been lowered to or below a predetermined value as a result of increase of the actual value of the engine torque Te toward the required engine torque Tedem. The above-indicated predetermined value of the rate of rise of the engine torque Te is set to be a value at or below which a rate of rise of the turbine speed $\omega t$ after initiation of the inertia phase of the shift-down action of the step-variable transmission 104 falls within a permissible range (in which a risk of racing of the turbine speed $\omega t$ is sufficiently low).

The engine stability time estimating portion 126 is configured to estimate the length of stability time Tstb according to a predetermined estimating map which is obtained by experimentation or theoretical analysis and stored in a memory. For example, the predetermined estimating map is a relationship between the length of stability time Tstb, and a selected one of various parameters relating to the length of stability time Tstb, such as: engine torque Te or a value (e.g., intake air quantity Qair) relating to the engine torque Te, at the moment of the determination to implement the shift-down action; required engine torque Tedem or a value (e.g., target intake air quantity Qair* or the accelerator pedal operation amount $\theta acc$) relating to the required engine torque Tedem; and a value (engine speed $\omega e$, cooling water temperature Tw, etc.) relating to the response of the engine torque Te. Thus, the estimating map is formulated to permit the engine stability time estimating portion 126 to estimate the length of stability time Tstb on the basis of the selected parameter and according to the estimating map.

The shifting delay determining portion 124 is configured to determine whether the estimated length of stability time Tstb is equal to or shorter than the predetermined value Tf. This predetermined value Tf is set to a length of time from the moment of generation of the shift-down command to implement the shift-down action of the step-variable transmission 104 to the moment of initiation of the inertia phase of the power-on shift-down action of the step-variable transmission 104. The shifting delay determining portion 124 stores a predetermined value determining map used to determine the predetermined value Tf for example.

The predetermined value determining map, which is obtained by experimentation or theoretical analysis, is a relationship between the predetermined value Tf, and a selected one of various parameters relating to the predetermined value Tf (namely, relating to the moment of initiation of the inertia phase). For instance, those parameters include: vehicle running speed V; transmission input torque Ti or a value (accelerator pedal operation amount $\theta acc$) relating to the transmission input torque Ti; and temperature THoil of the working fluid. The shifting delay determining portion 124 determines the predetermined value Tf on the basis of the selected parameter, and according to the predetermined value determining map, which is formulated such that the engine torque Te can be considered to have been stabilized during a time period from the moment of determination to implement the shift-down action to the moment of initiation of the inertia phase of the shift-down action, if the estimated length of stability time Tstb is not longer than the predetermined value Tf.

The shifting delay determining portion 124 is further configured to determine whether the estimated length of stability time Tstb is equal to or shorter than the predetermined value Tf. When the estimated length of stability time Tstb is equal to or shorter than the predetermined value Tf (that is, when Tstb≤Tf), the shifting delay determining portion 124 determines that the moment of generation of the shift-down command should not be delayed, and commands the transmission shifting control portion 122 to generate the shift-down command at the moment of determination to implement the shift-down action. Where the estimated length of stability time Tstb is equal to or shorter than the predetermined value Tf, the engine torque Te is stabilized prior to the moment of initiation of the inertia phase of the shift-down action of the step-variable transmission 104, without delaying the moment of generation of the shift-down command, so that the engine torque Te is stabilized after the moment of initiation of the inertia phase of the shift-down action, and the rate of rise of the turbine speed ωt in the inertia phase falls within the permissible range. Therefore, the risk of racing of the turbine speed ωt is reduced, and the risk of generation of the engaging shock of the engaging-side coupling device CB is reduced. Further, the moment of generation of the shift-down command is not delayed, so that the risk of deterioration of the control response of the shift-down action is reduced.

When the estimated length of stability time Tstb is longer than the predetermined value Tf (that is, when Tstb>Tf), on the other hand, the engine torque Te is not stabilized even after the moment of initiation of the inertia phase, unless the moment of generation of the shift-down command is delayed. Accordingly, the rate of rise of the turbine speed ωt after the moment of initiation of the inertia phase is relatively high, giving rise to a high risk of generation of a considerable engaging shock of the engaging-side coupling device CB due to racing of the turbine speed ωt. In view of this, the shifting delay determining portion 124 determines that the moment of generation of the shift-down command to implement the shift-down action should be delayed with respect to the moment of determination to implement the shift-down action, when the estimated length of stability time Tstb is longer than the predetermined value Tf. Further, the shifting delay determining portion 124 commands the transmission shifting control portion 122 to delay the moment of generation of the shift-down command to implement the shift-down action, by a delay time Tdelay which is set to be longer than a difference (=Tstb−Tf) between the estimated length of stability time Tstb and the predetermined value Tf. The delay time Tdelay is calculated by adding an extra time to the difference (=Tstb−Tf) between the estimated length of stability time Tstb and the predetermined value Tf. The extra time is determined by taking account of various variations of the running state of the vehicle 100.

The transmission shifting control portion 122 applies the hydraulic control command signals Sat (shift-down command) to the hydraulic control unit 108 for implementing the shift-down action, when the delay time Tdelay has passed after the moment of determination to implement the shift-down action, so that the moment of initiation of the shift-down action is delayed by the calculated delay time Tdelay. Thus, the moment of generation of the shift-down command is delayed by the calculated delay time Tdelay, so that the inertia phase of the shift-down action is initiated after the engine torque Te has been stabilized, whereby the rate of rise of the turbine speed ωt during the inertia phase is held within the permissible range. Accordingly, the risk of racing of the turbine speed ωt is reduced, and the risk of generation of the engaging shock of the engaging-side coupling device CB is reduced.

An increase of the delay time Tdelay with respect to the moment of generation of the shift-down command causes an increase of the delay in command for shifting, thus an increase of the risk of deterioration of the control response of the shift-down action (drivability of the vehicle 100). In view of this, the shifting delay determining portion 124 has the upper limit (permissible maximum value) Tlim of the delay time Tdelay below which the degree of deterioration of the drivability of the vehicle 100 is held permissible. Where the calculated delay time Tdelay is longer than the upper limit Tlim, the upper limit Tlim is set as the delay time Tdelay. This upper limit Tim is changed according to various parameters such as the vehicle running speed V, the selected position of the shift lever 56, the presently established drive mode of the vehicle 100 and the accelerator pedal operation amount θacc, so that the degree of deterioration of the drivability is held permissible.

Figure 10:
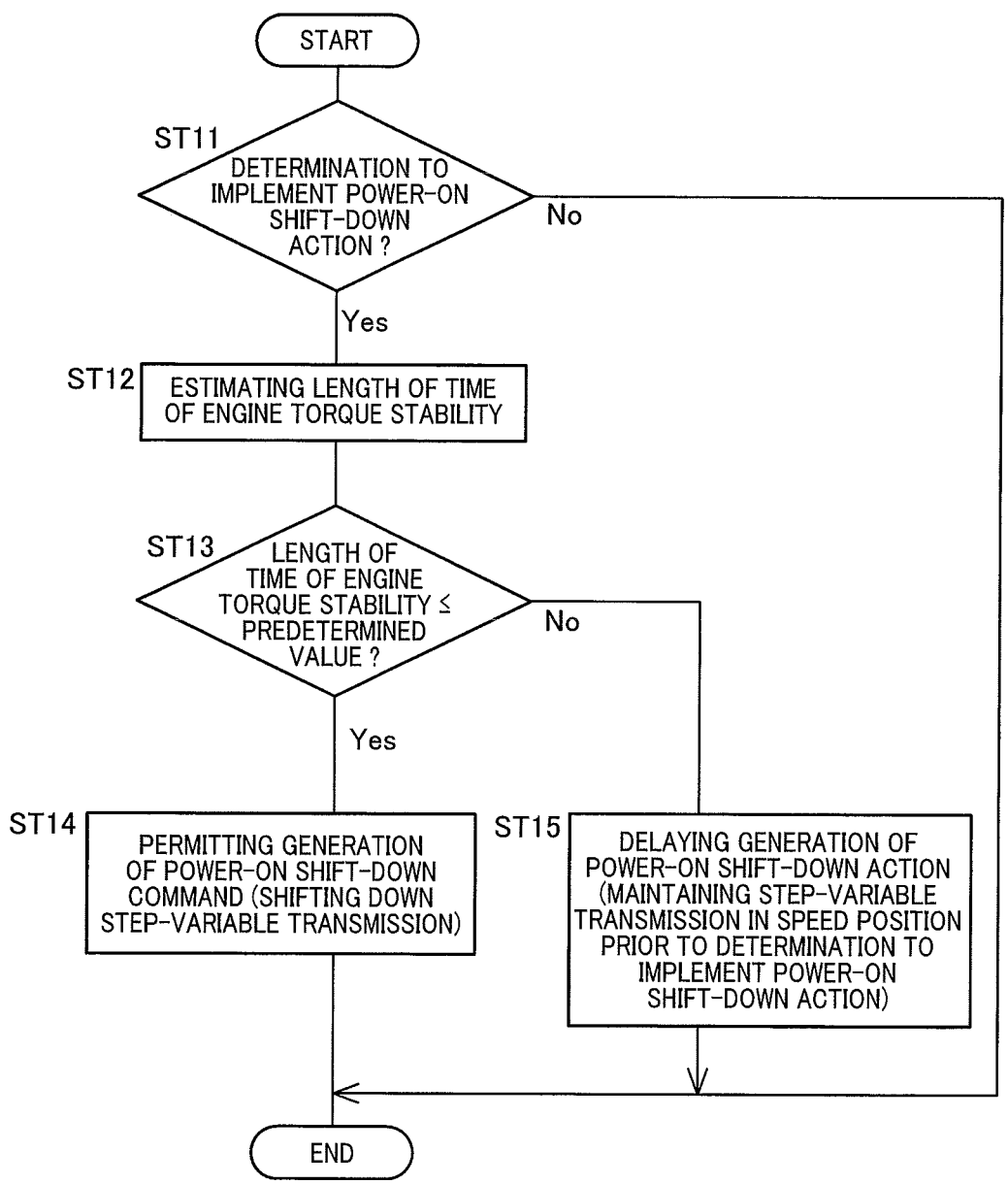
FIG. 10 is a flow chart illustrating an essential part of a control routine executed by the electronic control device shown in FIG. 9, namely, a control operation implemented so as to reduce the risk of generation of the engaging shock of the coupling device of the step-variable transmission in the process of a power-on shift-down action of the step-variable transmission.

FIG. 10 is the flow chart illustrating an essential part of a control routine executed by the electronic control device 110, namely, a control operation implemented so as to reduce the risk of generation of the engaging shock of the engaging-side coupling device CB of the step-variable transmission 104 in the process of its power-on shift-down action. This control routine is repeatedly executed during running of the vehicle 100.

The control routine of FIG. 10 is initiated with a step ST11 corresponding to a function of the transmission shifting control portion 122, to determine whether a determination to implement the power-on shift-down action of the step-variable transmission 104 has been made or not. If a negative determination is obtained in the step ST11, one cycle of execution of the control routine is terminated. If the determination to implement the power-on shift-down action is made, an affirmative determination is obtained in the step ST11, and the control flow goes to a step ST12 corresponding to a function of the engine stability time estimating portion 126, to estimate the length of stability time Tstb required for stabilization of the engine torque Te, on the basis of the engine torque Te, the required engine torque Tedem, etc.

The step ST12 is followed by a step ST13 corresponding to a function of the shifting delay determining portion 124, to determine whether the estimated length of stability time Tstb is equal to or shorter than the predetermined value Tf. If an affirmative determination is obtained in the step ST13, the control flow goes to a step ST14 corresponding to a function of the transmission shifting control portion 122, to generate the hydraulic control command signals Sat (shift-down command) to be applied to the hydraulic control unit 108, for implementing the shift-down action of the step-variable transmission 104, so that the shift-down action is initiated at the moment of determination to implement the shift-down action. If the estimated length of stability time Tstb is longer than the predetermined value Tf, a negative determination is obtained in the step ST13, and the control flow goes to a step ST15.

In the step ST15 corresponding to the transmission shifting control portion 122 and the shifting delay determining portion 124, the delay time Tdelay is calculated, and the hydraulic control command signals Sat (shift-down command) are generated and applied to the hydraulic control unit 108 when the calculated delay time Tdelay has passed after the moment of determination to implement the shift-down action. Accordingly, the inertia phase of the power-on shift-down action of the step-variable transmission 104 is initiated after the engine torque Te has been stabilized, so that the rate of rise of the turbine speed ωt during the inertia phase is restricted, and the risk of generation of the engaging shock of the engaging-side coupling device CB in the process of the shift-down action is reduced.

Figure 11:
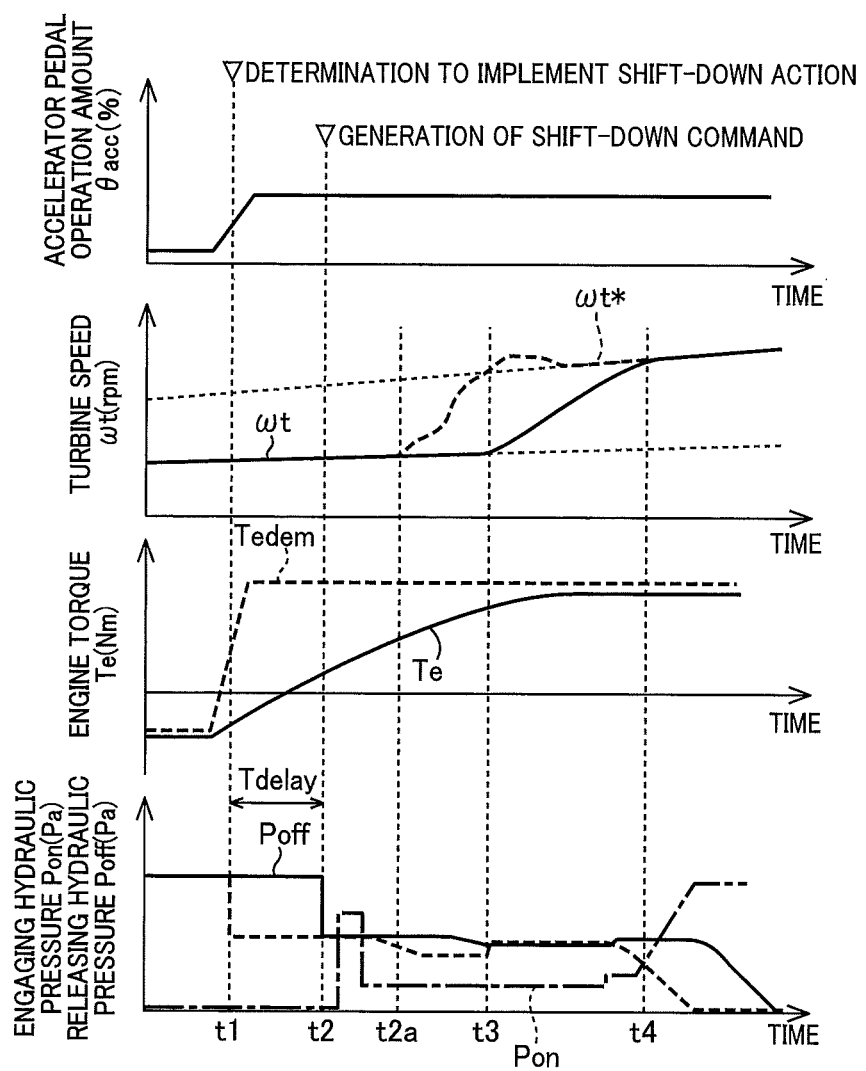
FIG. 11 is a time chart showing an example of changes of various parameters when the control operation illustrated in the flow chart of FIG. 10 is performed.

FIG. 11 is the time chart showing an example of changes of various parameters when the control operation illustrated in the flow chart of FIG. 10 is performed. In the example of the time chart of FIG. 11, the length of stability time Tstb estimated upon determination to implement the power-on shift-down action of the step-variable transmission 104 is longer than the predetermined value Tf. In the time chart of FIG. 11, the time is taken along a horizontal axis, while the accelerator pedal operation amount θacc, the turbine speed ωt, the engine torque Te, a commanded engaging hydraulic pressure Pon of the engaging-side coupling device CB, and a commanded releasing hydraulic pressure Poff of the releasing-side coupling device CB are taken along a vertical axis. Further, "t1" represents a point of time at which the determination to implement the shift-down action of the step-variable transmission 104 is made, while "t2" represents a point of time at which the shift-down command (in the form of the hydraulic control command signals Sat) is generated.

As shown in FIG. 11, the accelerator pedal operation amount θacc is increased as a result of a depressing operation of the accelerator pedal prior to the point of time t1, so that the engine torque Te is accordingly increased. At the point of time t1, the determination to implement the shift-down action of the step-variable transmission 104 is made as a result of an increase of the accelerator pedal operation amount θacc. When the determination to implement the shift-down action is made at the point of time t1, the determination as to whether the estimated length of stability time Tstb is equal to or shorter than the predetermined value Tf is made. Since the estimated length of stability time Tstb is longer than the predetermined value Tf, a determination to delay the moment of generation of the shift-down command is made, and the delay time Tdelay is calculated. The shift-down command is generated at the point of time t2 which is after the point of time t1 by the calculated delay time Tdelay.

At the point of time t2, the releasing hydraulic pressure Poff of the releasing-side coupling device CB to be brought into its released state in the process of the shift-down action is lowered to a predetermined value and held at this value, as indicated by a solid line. On the other hand, the engaging hydraulic pressure Pon of the engaging-side coupling device CB to be brought into its engaged state in the process of the shift-down action is temporarily raised (to quickly fill an oil chamber in the relevant coupling device CB) at a point of time a predetermined length of time after the point of time t2, then lowered to a predetermined value and held at this value, as indicated by a one-dot chain line.

At a point of time t3, the inertia phase of the power-on shift-down action of the step-variable transmission 104 is initiated. Since the moment of generation of the shift-down command is delayed by the delay time Tdelay, the engine torque Te is raised to a value close to the required engine torque Tedem, while the rate of rise of the engine torque Te is held within a permissible range (held in a stabilized state). Accordingly, the rate of rise of the turbine speed ωt during the inertia phase is held within the permissible range, and the risk of racing of the turbine speed ωt near a point of time t4 is reduced. At the point of time t4 at which the turbine speed ωt has reached a target value ωt* (synchronizing speed) after completion of the shift-down action, the engaging hydraulic pressure Pon is raised while the rate of rise of the turbine speed ωt is held within the permissible range, so that the risk of racing of the turbine speed ωt at the point of time t4 is reduced, and the risk of generation of the engaging shock of the engaging-side coupling device CB is also reduced.

Broken lines in FIG. 11 indicate changes of the various parameters where the moment of generation of the shift-down command is not delayed. In this case, the releasing hydraulic pressure Poff is lowered at the point of time t1, and the inertia phase is initiated at a point of time t2a, as indicated by the broken lines. The rate of rise of the engine torque Te is high even after this point of time t2a, the rate of rise of the turbine speed ωt is high, so that the racing of the turbine speed ωt takes place at the point of time t3. In this state, the engaging-side coupling device CB has a relatively large amount of engaging shock.

The present second embodiment has substantially the same advantages as the first embodiment, permitting reduction of the risk of generation of the engaging shock of the engaging-side coupling device CB in the process of its engaging action to implement the power-on shift-down action of the step-variable transmission 104.

While the preferred embodiments of this invention have been described in detail by reference to the drawings, it is to be understood that the invention may be otherwise embodied.

In the illustrated first embodiment, the vehicle 10 is the hybrid vehicle having the drive power source including the engine 14, the differential mechanism 32, the first motor/generator MG1 and the second motor/generator MG2. However, the control apparatus according to the present invention is equally applicable to other types of a hybrid vehicle, such as a hybrid vehicle having only one motor/generator disposed between and operatively connected to the engine and the step-variable transmission in a power transmittable manner. Further, the step-variable transmission may have AT gear positions other than those in the vehicle 10, or configurations of connection of rotary elements other than that in the vehicle 10.

In the illustrated embodiments, the estimating map to estimate the length of stability time Tstb is the relationship between the length of stability time Tstb, and a selected one of various parameters such as: the engine power Pe (engine torque Te) or a value relating to the engine power Pe or engine torque Te; the required engine power Pedem (the required engine torque Tedem) or a value relating to the required engine power Pedem (required engine torque Tedem); and a value relating to the response of the engine power Pe or engine torque Te. However, the parameters are not limited to those indicated above, and at least one of the parameters may be used in the estimating map. Further, the length of stability time Tstb need not be obtained according to a predetermined map, and may be estimated according to a predetermined equation.

In the illustrated embodiments, the map to set the predetermined value Tf of the length of stability time Tstb is the relationship between the predetermined value Tf, and a selected one of various parameters such as: the working fluid temperature THoil; the input torque Ti of the step-variable transmission 20 or a value (accelerator pedal operation amount θacc) relating to the input torque Ti; and the vehicle running speed V. However, the parameters are not limited to those indicated above, and at least one of the parameters may be used in the map. Further, the predetermined value Tf need not be obtained according to a predetermined map, and may be set according to a predetermined equation.

The illustrated embodiments may be modified to additionally implement a control so as not to delay the moment of generation of the shift-down command or shorten the delay time Tdelay, where it is determined that the rate of rise of the input shaft speed ωi can be restricted by regenerative control of the second motor/generator MG2 in the process of the power-on shift-down action, that is, where it is determined that the maximum charging amount Win of the battery 52 is sufficiently large and the risk of generation of the engaging shock of the engaging-side coupling device CB can be reduced by the regenerative control of the second motor/generator MG2.

It is to be understood that the embodiments and modifications described above are given for illustrative purpose only, and that the present invention may be embodied with various other changes and improvements which may occur to those skilled in the art.

NOMENCLATURE OF ELEMENTS

10, 100: Vehicle
14, 102: Engine (Drive power source)
20, 104: Step-variable transmission
28: Drive wheels
30: Intermediate power transmitting member (Input shaft)
32: Differential mechanism
80, 110: Electronic control device (Control apparatus)
82, 122: Transmission shifting control portion (Control portion)
86, 124: Shifting delay determining portion (Control portion)
88, 126: Engine stability time estimating portion
CB: Coupling devices
MG1: First motor/generator
MG2: Second motor/generator
RE1: First rotary element
RE2: Second rotary element
RE3: Third rotary element
Te: Engine torque (Output state of engine)
Pe: Engine power (Output state of engine)
Tstb: Length of time of stability
Tf: Predetermined value
Tlim: Upper limit

What is claimed is:

1. A control apparatus for a vehicle provided with a step-variable transmission which is disposed between drive wheels and a drive power source including at least an engine, and which is shifted by changing operating states of coupling devices of the step-variable transmission, the control apparatus comprising:

an engine stability time estimating portion configured to estimate a length of stability time when a determination to implement a power-on shift-down action of the step-variable transmission is made, the length of stability time being a length of time from a moment at which the determination to implement the power-on shift-down action is made to a time at which stabilization of an output of the engine occurs during the power-on shift-down action; and a control portion configured to delay a moment of generation of a shift-down command to implement the power-on shift-down action of the step-variable transmission, with respect to a moment at which the determination to implement the power-on shift-down action was made, when the estimated length of stability time is longer than a predetermined value.

2. The control apparatus according to claim 1, wherein the control portion calculates a length of the delay of the moment of generation of the shift-down command from the moment at which the determination to implement the power-on shift-down action was made, so that the length of the delay increases as the estimated length of stability time increases.

3. The control apparatus according to claim 1, wherein the length of stability time is a length of time until a rate of increase of an output torque or power of the engine is lowered to or below a predetermined threshold, in the process of the power-on shift-down action of the step-variable transmission.

4. The control apparatus according to claim 2, wherein the length of the delay of the moment of generation of the shift-down command has a predetermined upper limit, and the predetermined upper limit is set as the length of the delay when the calculated length of the delay is longer than the predetermined upper limit.

5. The control apparatus according to claim 1, wherein the predetermined value of the length of stability time is set to be a length of time from the moment of generation of the shift-down command to a moment of initiation of an inertia phase of the power-on shift-down action of the step-variable transmission.

6. The control apparatus according to claim 2, wherein the length of the delay of the moment of generation of the shift-down command is set to be equal to or longer than a difference between the estimated length of stability time and the predetermined value.

7. The control apparatus according to claim 1, wherein the drive power source includes the engine, a differential mechanism and a second motor/generator, and the differential mechanism includes a first rotary element operatively connected to the engine in a power transmittable manner, a second rotary element operatively connected to a first motor/generator in a power transmittable manner, and a third rotary element connected to an input shaft of the step-variable transmission, the second motor/generator being operatively connected to the third rotary element in a power transmittable manner.

* * * * *